(12) United States Patent
Liu et al.

(10) Patent No.: US 12,372,489 B2
(45) Date of Patent: Jul. 29, 2025

(54) ELECTROTHERMAL CHARACTERIZATION OF MICRO-SCALE AND NANO-SCALE SAMPLES AND RELATED SYSTEMS

(71) Applicant: ACS Thermal LLC, Exeter, NH (US)

(72) Inventors: Guoqing Liu, Pasadena, CA (US); Richard S. Ploss, Exeter, NH (US); Xinwei Wang, Ames, IA (US)

(73) Assignee: ACS Thermal LLC, Exeter, NH (US)

( * ) Notice: Subject to any disclaimer, the term of this patent is extended or adjusted under 35 U.S.C. 154(b) by 594 days.

(21) Appl. No.: 17/895,915

(22) Filed: Aug. 25, 2022

(65) Prior Publication Data

US 2023/0349849 A1    Nov. 2, 2023

Related U.S. Application Data

(60) Provisional application No. 63/337,364, filed on May 2, 2022.

(51) Int. Cl.
  *G01N 25/20*    (2006.01)
  *G01N 25/00*    (2006.01)
  *G01N 25/18*    (2006.01)

(52) U.S. Cl.
  CPC ........... *G01N 25/20* (2013.01); *G01N 25/005* (2013.01); *G01N 25/18* (2013.01)

(58) Field of Classification Search
  CPC ....... G01N 25/18; G01N 25/20; G01N 25/005
  (Continued)

(56) References Cited

U.S. PATENT DOCUMENTS

2015/0127294 A1\* 5/2015 Lubner .................. G01N 25/18
                                                        702/136

FOREIGN PATENT DOCUMENTS

CN    109580709 A  *  4/2019
CN    111610224 A  *  9/2020  ............. G01N 25/20

OTHER PUBLICATIONS

Ashegi et al., Micro- and Nano-Scale Diagnostic Techniques for Thermometry and Thermal Imaging of Microelectronic and Data Storage Devices. In: Microscale Diagnostic Techniques. 2005. Breuer, Ed. Chapter 4:155-96.

(Continued)

*Primary Examiner* — Mirellys Jagan

(74) *Attorney, Agent, or Firm* — Wolf, Greenfield & Sacks, P.C.

(57) ABSTRACT

Transient techniques for electrothermal characterization of small (e.g., micro-scale or nano-scale) samples are described. These techniques overcome some of the limitations existing in conventional approaches. These transient techniques involve causing a temperature variation inside a sample, and determining a transient signal response (e.g., a voltage rise or drop) arising in the sample as a result of the temperature variation. In some embodiments, the temperature variation may be caused by allowing amplitude modulated electric current (e.g., stepped current or periodic stepped current) to flow through the sample. Alternatively, or additionally, the temperature variation may be caused by controlling a laser source to irradiate the sample. Thermal characteristics of the sample (e.g., thermal diffusivity, thermal conductivity, specific heat) can be determined based on the transient response. These transient techniques can be executed by a computer system in an automatic fashion, e.g., without having to rely on a user to manually pre-process the measurement data.

31 Claims, 13 Drawing Sheets

(58) Field of Classification Search
USPC .......................................................... 374/43
See application file for complete search history.

(56) References Cited

OTHER PUBLICATIONS

Cahill, Thermal conductivity measurement from 30 to 750 K: the 3ω method. Rev Sci Instrum. Jun. 4, 1998;61(2):802-8.

Chen et al., Macroscopic Graphene Fibers Directly Assembled from CVD-Grown Fiber-Shaped Hollow Graphene Tubes. Angew Chem Int Ed. Dec. 1, 2015;54(49):14947-50.

Cheng et al., Graphene Fiber-Based Wearable Supercapacitors: Recent Advances in Design, Construction, and Application. Small Methods. Sep. 2021;5(9):e2100502. doi: 10.1002/smtd.202100502. Epub Aug. 16, 2021.

Choi et al., Measurement of the thermal conductivity of individual carbon nanotubes by the four-point three-omega method. Nano Lett. Aug. 2006;6(8):1589-93. doi: 10.1021/nl060331v.

Dong et al., Facile fabrication of light, flexible and multifunctional graphene fibers. Adv Mater. Apr. 10, 2012;24(14):1856-61. doi: 10.1002/adma.201200170. Epub Mar. 14, 2012.

Dong et al., Thermal Conductivity, Electrical Resistivity, and Microstructure of Cu/W Multilayered Nanofilms. ACS Appl Mater Interfaces. Feb. 19, 2020;12(7):8886-8896. doi: 10.1021/acsami.9b21182. Epub Feb. 7, 2020.

El Sachat et al., Heat Transport Control and Thermal Characterization of Low-Dimensional Materials: A Review. Nanomaterials (Basel). Jan. 13, 2021;11(1):175. doi: 10.3390/nano11010175.

Fang et al., Handedness-controlled and solvent-driven actuators with twisted fibers. Mater Horizons. Mar. 6, 2019;6(6):1207-14. Accepted Manuscript.

Fu et al., Thermal Characterization of Low-Dimensional Materials by Resistance Thermometers. Materials (Basel). May 29, 2019;12(11):1740. doi: 10.3390/ma12111740.

Guo et al., Development of pulsed laser-assisted thermal relaxation technique for thermal characterization of microscale wires. J Appl Phys. Jun. 5, 2008;103(11):113505.

Guo et al., Thermal characterization of microscale conductive and nonconductive wires using transient electrothermal technique. J Appl Phys. Mar. 28, 2007;101(6):063537.

Guo et al., Thermal characterization of multi-wall carbon nanotube bundles based on pulsed laser-assisted thermal relaxation. Func Mater Letters. Feb. 2008;1(1):71-6.

Hippalgaonkar et al., Experimental Studies of Thermal Transport in Nanostructures. In: Thermal Transport in Carbon-Based Nanomaterials. A volume in Micro and Nano Technologies. 2017. Zhang, Ed. Chapter 12:319-57.

Huang et al., Thermophysical properties of multi-wall carbon nanotube bundles at elevated temperatures up to 830 K. Carbon. Apr. 2011;49(5):1680-91.

Jalili et al., Scalable One-Step Wet-Spinning of Graphene Fibers and Yarns from Liquid Crystalline Dispersions of Graphene Oxide: Towards Multifunctional Textiles. Adv Func Mater. May 27, 2013;23(43):5345-54.

Li et al., Flexible graphene fibers prepared by chemical reduction-induced self-assembly. J Mater Chem A. Feb. 21, 2014;2(18):6359-62.

Li et al., Highly Crystalline Graphene Fibers with Superior Strength and Conductivities by Plasticization Spinning. Adv Func Mater. Dec. 22, 2020;30(52):2006584.

Lin et al., Thermal and electrical conduction in ultrathin metallic films: 7 nm down to sub-nanometer thickness. Small. Aug. 12, 2013;9(15):2585-94. doi: 10.1002/smll.201202877. Epub Feb. 22, 2013.

Lin et al., Thermal transport in graphene fiber fabricated by wet-spinning method. Mater Lett. Nov. 15, 2016;183:147-50.

Liu et al., Photothermal phenomenon: Extended ideas for thermophysical properties characterization. J Appl Phys. Feb. 11, 2022;131(6):065107.

Liu et al., Review on Techniques for Thermal Characterization of Graphene and Related 2D Materials. Nanomaterials (Basel). Oct. 21, 2021;11(11):2787. doi: 10.3390/nano11112787.

Liu et al., Superb Electrically Conductive Graphene Fibers via Doping Strategy. Adv Mater. Sep. 2016;28(36):7941-7947. doi: 10.1002/adma.201602444. Epub Jul. 4, 2016.

Liu et al., Thermal conductivity of giant mono- to few-layered CVD graphene supported on an organic substrate. Nanoscale. May 21, 2016;8(19):10298-309. doi: 10.1039/c6nr02258h. Epub Apr. 29, 2016.

Liu et al., Thermal Conductivity of Ultrahigh Molecular Weight Polyethylene Crystal: Defect Effect Uncovered by 0 K Limit Phonon Diffusion. ACS Appl Mater Interfaces. Dec. 16, 2015;7(49):27279-88. doi: 10.1021/acsami.5b08578. Epub Dec. 4, 2015.

Lu et al., 3ω method for specific heat and thermal conductivity measurements. Rev Sci Instrum. Jun. 26, 2001;72(7):2996-3003.

Ma et al., Systematic characterization of transport and thermoelectric properties of a macroscopic graphene fiber. Nano Res. Sep. 1, 2016;9(11):3536-46.

McNamara et al., Behavior of Neural Cells Post Manufacturing and After Prolonged Encapsulation within Conductive Graphene-Laden Alginate Microfibers. Adv Biol (Weinh). Nov. 2021;5(11):e2101026. doi: 10.1002/adbi.202101026. Epub Oct. 8, 2021.

Picard et al., Determination of the specific heat capacity of a graphite sample using absolute and differential methods. Metrologia. Sep. 12, 2007;44(5):294.

Qiu et al., Experimental techniques overview. In: Micro and Nano Thermal Transport Characterization, Measurement, and Mechanism. 2022. Qiu et al., Eds. Chapter 2:19-45.

Shi et al., Measuring Thermal and Thermoelectric Properties of One-Dimensional Nanostructures Using a Microfabricated Device. J Heat Transfer. Oct. 2003;125(5):881-8.

Wang et al., Characterization of thermal diffusivity of micro/nanoscale wires by transient photo-electro-thermal technique. Appl Phys A. Mar. 16, 2007;87(4):599-605.

Wang et al., Measuring nanowire thermal conductivity at high temperatures. Meas Sci Technol. Jan. 9, 2018;29(2):025001.

Wang et al., Thermal properties of two dimensional layered materials. Adv Func Mater. May 18, 2017;27(19):1604134.

Xie et al., 19-Fold thermal conductivity increase of carbon nanotube bundles toward high-end thermal design applications. Carbon. Nov. 2018;139:445-58. Accepted Manuscript.

Xie et al., Characterization of thermal conductivity, diffusivity, specific heat, and interface thermal resistance of carbon nanostructures. In: Thermal Behaviour and Applications of Carbon-Based Nanomaterials. 2020. Papavassiliou et al., Eds. Chapter 3:57-89.

Xie et al., Thermal reffusivity: uncovering phonon behavior, structural defects, and domain size. Frontiers in Energy. Jan. 5, 2018;12(1):143-157.

Xin et al., Highly thermally conductive and mechanically strong graphene fibers. Science. Sep. 4, 2015;349(6252):1083-7. doi: 10.1126/science.aaa6502.

Xin et al., Microfluidics-enabled orientation and microstructure control of macroscopic graphene fibres. Nat Nanotechnol. Feb. 2019;14(2):168-175. doi: 10.1038/s41565-018-0330-9. Epub Jan. 14, 2019.

Xu et al., Photocurrent in carbon nanotube bundle: Graded Seebeck coefficient phenomenon. Nano Energy. Aug. 2021;86:106054.

Zheng et al., Graphene-based fibers for the energy devices application: A comprehensive review. Materials & Design. Mar. 2021;201:109476.

Zhu et al., Novel Polyethylene Fibers of Very High Thermal Conductivity Enabled by Amorphous Restructuring. ACS Omega. Jul. 26, 2017;2(7):3931-44.

\* cited by examiner

ELECTROTHERMAL CHARACTERIZATION OF MICRO-SCALE AND NANO-SCALE SAMPLES AND RELATED SYSTEMS

RELATED APPLICATION

This application claims the benefit under 35 U.S.C. § 119(e) of U.S. Provisional Patent Application Ser. No. 63/337,364, entitled "TRANSIENT ELECTROPHONON TECHNIQUE," filed on May 2, 2022, which is hereby incorporated by reference herein in its entirety.

BACKGROUND

Electrothermal characterization of samples has become increasingly important in recent years. Techniques that can be applied to large-scale materials are commonplace and appropriate for many applications. However, relatively fewer techniques are available for electrothermal characterization of micro-scale and nano-scale samples (e.g., graphene nano-fibers). These techniques include the 3ω method, the micro-fabricated suspended method and the optical heating and electrical thermal sensing (OHETS) technique.

SUMMARY

Some embodiments relate to a method for determining a thermal characteristic of a sample. The method comprises coupling a first portion of the sample to a first electrode and a second portion of the sample to a second electrode; causing a temperature variation in the sample; determining content associated with a first variable representing a transient signal arising between the first and second electrodes in response to the temperature variation; determining content associated with a second variable using a logarithmic function and the content of the first variable; and determining the thermal characteristic of the sample by applying a linear regression to the content of the second variable.

In some embodiments, causing the temperature variation in the sample comprises controlling a current generator, coupled to the first and second electrodes, to generate an electric current.

In some embodiments, the electric current comprises a stepped profile.

In some embodiments, the stepped profile comprises a transition having a rise time of 1 msec or less.

In some embodiments, causing the temperature variation in the sample comprises controlling a laser source to irradiate the sample.

In some embodiments, the temperature variation is in a range from 1 K to 10 K.

In some embodiments, determining content associated with the first variable comprises sensing a voltage arising between the first electrode and the second electrode over time.

In some embodiments, determining the content associated with the second variable comprises determining content associated with a third variable representing a steady-state signal arising between first and second electrodes in response to the temperature variation; determining content associated with a fourth variable by subtracting the content associated with the third variable from the content associated with the first variable; and applying the logarithmic function to the content associated with the fourth variable.

In some embodiments, the logarithmic function comprises a natural logarithmic function.

In some embodiments, determining the thermal characteristic of the sample comprises determining a thermal diffusivity, a thermal conductivity, and/or a specific heat of the sample.

In some embodiments, the method further comprises determining a value representing an uncertainty associated with the thermal characteristic using the linear regression.

In some embodiments, the uncertainty is at least two orders of magnitude less than the thermal characteristic of the sample.

In some embodiments, the uncertainty is about $5 \times 10^{-9}$ $m^2/s$ or less.

In some embodiments, the thermal characteristic of the sample is temperature-dependent, wherein the method further comprises determining a temperature of the sample, and wherein determining the thermal characteristic of the sample comprises determining the thermal characteristic of the sample based on the temperature of the sample.

In some embodiments, the method further comprises, subsequent to coupling the first portion of the sample to the first electrode and the second portion of the sample to the second electrode: applying a conductive paste to the first and second electrodes.

In some embodiments, the first and second electrodes are disposed in a housing, wherein the method further comprises, prior to causing the temperature variation in the sample: reducing a pressure within the housing using a vacuum pump.

Some embodiments relate to a system for determining a thermal characteristic of a sample. The system comprises a housing; first and second electrodes disposed in the housing; and a processor configured to: cause a temperature variation in the sample; determine content associated with a first variable representing a transient signal arising between the first and second electrodes in response to the temperature variation; determine content associated with a second variable using a logarithmic function and the content of the first variable; and determine the thermal characteristic of the sample by applying a linear regression to the content of the second variable.

In some embodiments, the system further comprises a current generator coupled to the first and second electrodes, wherein the processor is configured to cause the temperature variation in the sample by controlling the current generator to generate an electric current.

In some embodiments, the electric current comprises a stepped profile.

In some embodiments, the stepped profile comprises a transition having a rise time of less than 1 msec.

In some embodiments, the system further comprises a laser source, wherein the processor is configured to cause the temperature variation in the sample by controlling the laser source to irradiate the sample.

In some embodiments, the temperature variation is in a range from 1 K to 10 K.

In some embodiments, the system further comprises a voltage sensor disposed in the housing.

In some embodiments, the processor is configured to determine the content associated with the second variable by: determining content associated with a third variable representing a steady-state signal arising between first and second electrodes in response to the temperature variation; determining content associated with a fourth variable by subtracting the content associated with the third variable from the content associated with the first variable; and applying the logarithmic function to the content associated with the fourth variable.

In some embodiments, the logarithmic function comprises a natural logarithmic function.

In some embodiments, determining the thermal characteristic of the sample comprises determining a thermal diffusivity, a thermal conductivity, and/or a specific heat of the sample.

In some embodiments, the processor is further configured to determine a value representing an uncertainty associated with the thermal characteristic using the linear regression.

In some embodiments, the system further comprises a temperature sensor disposed in the housing and configured to determine a temperature of the sample, wherein the thermal characteristic of the sample is temperature-dependent, and wherein determining the thermal characteristic of the sample comprises determining the thermal characteristic of the sample based on the temperature determined by the temperature sensor.

In some embodiments, the system further comprises a heater disposed in the housing, and the controller is further configured to set a temperature of the sample by controlling the heater to produce heat.

In some embodiments, the system further comprises a conductive paste applied to the first and second electrodes.

In some embodiments, the system further comprises a vacuum pump coupled to the housing.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

I. Overview

Figure 1:
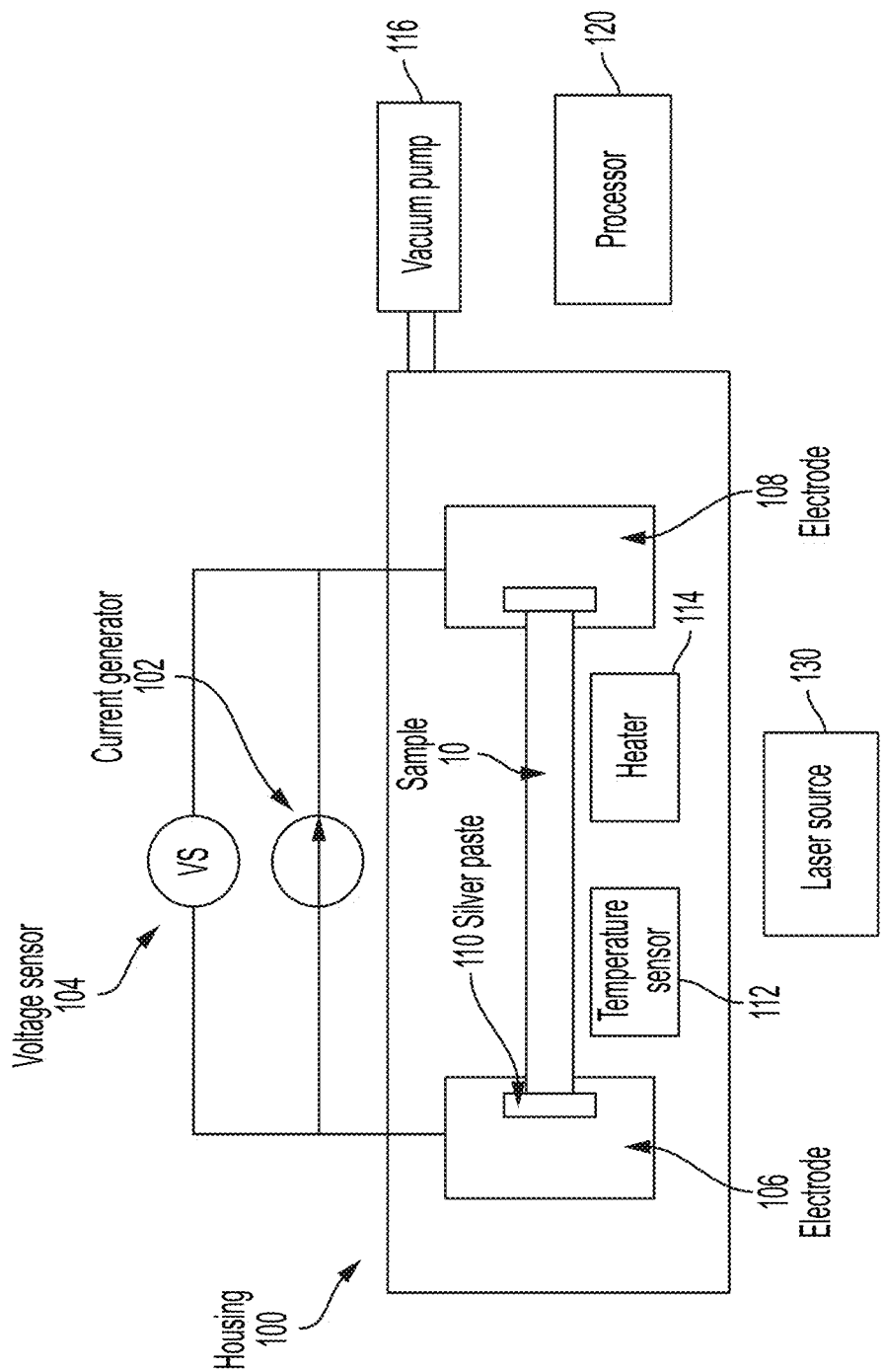
FIG. 1 is a block diagram illustrating a system for determining a thermal characteristic of a sample, in accordance with some embodiments of the technology described herein.

Described herein are transient techniques aimed at characterizing thermal characteristics of small (e.g., micro-scale or nano-scale) samples. These transient techniques involve analyzing the transient response to an excitation. In some embodiments, this analysis can be accomplished by applying an excitation that results in a temperature variation inside a sample, and by determining a transient signal response arising in the sample (e.g., measuring a voltage rise or drop) as a result of the temperature variation. In some embodiments, the temperature variation may be caused by allowing amplitude modulated electric current (e.g., stepped current or periodic stepped current) to flow through the sample. Alternatively, or additionally, the temperature variation may be caused by controlling a laser source to irradiate the sample. Thermal characteristics (e.g., thermal diffusivity, thermal conductivity, specific heat) of the sample can be determined based on the transient signal response.

The transient techniques developed by the inventors overcome several limitations of known techniques for electrothermal characterization of micro-scale and nano-scale samples. As one example, the 3ω method is limited to materials with linear current-voltage (I-V) behavior within the applied alternating current (AC) voltage range, which precludes application of the 3ω method to semi-conductive materials. In contrast, the transient techniques described herein may be used to characterize conductive, semi-conductive, and/or non-conductive materials. As another example, the micro-fabricated suspended method (also referred to as the micro-bridge method) is limited to materials with relatively high rates of thermal conductivity because of the high heat dissipation associated with the electrodes. In contrast, the transient techniques described herein may be used to characterize materials with a wide range of thermal conductivity values. Lastly, the OHETS technique requires very long time periods to obtain accurate measurements, due to the relatively low signal levels involved. As discussed in further detail below, the transient techniques described herein may be performed over relatively short time periods.

The transient techniques developed by the inventors can be executed by a computer system in an automatic fashion, e.g., without having to rely on a user to manually pre-process the measurement data (e.g., manual fitting and/or manual normalization). For example, execution of a transient technique may involve execution of a computer program that (1) controls a computer system to take a measurement with respect to a sample and/or (2) interprets the measurement data to determine a thermal characteristic of the sample. Executing a transient technique without having to rely on a user to manually pre-process the measurement data presents several benefits. First, it saves time. For example, electrothermal characterization of a sample according to techniques described herein may be performed in a matter of seconds (compared to hours, the time it can take to perform thermal characterization using some conventional techniques). This allows a user to evaluate more samples per unit time. Second, it removes errors that may otherwise arise in the manual pre-processing phase. The accuracy of a characterization technique involving manual pre-processing can vary largely depending upon the boundary conditions of the manual pre-processing. For example, manually fitting measurement data can produce very different results depending upon the time interval over which the manual fitting is performed. This is because the measurement data is typically noisy, thus putting the user in the position of having to guess the proper time interval over which to perform the fitting.

The inventors have further recognized and appreciated that by applying a logarithmic function to experimental data representing a transient signal occurring in response to a temperature variation in a sample, it is possible to accurately characterize the sample using a linear regression. In some embodiments, a linear regression is more desirable than a non-linear regression in that a linear regression enables a more precise estimate of the thermal characteristic of interest as well as a more precise estimate of the uncertainty associated with the regression.

The transient techniques described herein may be used to characterize thermal characteristics of any type of micro-scale or nano-scale sample. In some embodiments, a sample may comprise a conductive, semi-conductive, and/or non-conductive material. In certain cases, the sample comprises (and, in some cases, consists of) a conductive material. In some instances, the conductive material comprises one or more metals and/or one or more carbon-containing conductive materials. Non-limiting examples of suitable metals include gold, silver, copper, aluminum, platinum, zinc, and nickel. Non-limiting examples of suitable carbon-containing conductive materials include graphite, carbon black, and carbon nanotubes (e.g., single-wall carbon nanotubes, multi-wall carbon nanotubes). In some embodiments, the sample comprises (and, in some cases, consists of) a semi-conductive material. Non-limiting examples of suitable semi-conductive materials include graphene, silicon, germanium, silicon carbide, gallium nitride, gallium arsenide, and zinc oxide. In some embodiments the sample comprises (and, in some cases, consists of) a non-conductive material (i.e., an insulating material). The micro-scale or nano-scale sample may be prepared according to any method known in the art. Non-limiting examples of suitable methods include chemical vapor deposition (CVD), physical vapor deposition (PVD), twisting-drawing, low-temperature chemical reduction-induced self-assembly, and hydrothermal methods.

As an illustrative, non-limiting example, the techniques described herein may be used to characterize graphene samples. Due to properties such as high electrical conductivity (e.g., up to $2.24 \times 10^7$ $Sm^{-1}$) and high thermal conductivity, coupled with excellent flexibility and mechanical strength, graphene micro/nano-fibers can be employed in a wide range of applications spanning from medical to wearable supercapacitors, and including energy storage devices and human activity monitors. Having significant applicability to so many fields, electrothermal characterization of graphene micro/nano-fibers has become of paramount importance.

Thermal characterization of a sample in accordance with the techniques described herein may involve a system including a housing (e.g., a vacuum chamber), first and second electrodes disposed within the housing, and a processor. In some embodiments, the processor is configured to (1) cause a temperature variation in the sample (e.g., by controlling a current generator coupled to the electrodes to generate an electric current, or by controlling a laser source to irradiate the sample); (2) determine content associated with a first variable (e.g., voltage V) representing a transient signal arising between the first and second electrodes in response to the temperature variation; (3) determine content associated with a second variable using a logarithmic function (e.g., a natural logarithmic function) and the content of the first variable; and (4) determine the thermal characteristic (e.g., thermal diffusivity, thermal conductivity and/or specific heat) of the sample by applying a linear regression to the content of the second variable. In some embodiments, step (3) may involve (a) determining content associated with a third variable representing a steady-state signal (e.g., steady-state voltage $V_1$) arising between first and second electrodes in response to the temperature variation; (b) determining content associated with a fourth variable (e.g., $\Delta V$) by subtracting the content associated with the third variable (e.g., steady-state voltage $V_1$) from the content associated with the first variable (e.g., voltage V); and (c) applying the logarithmic function to the content associated with the fourth variable.

In some embodiments, the electric current comprises a stepped profile comprising at least one step transition from $I_0$ to $I_1$. In some embodiments, the at least one step transition has a rising time of 100 sec or less, 50 sec or less, 10 sec or less, 5 sec or less, 1 sec or less, 500 msec or less, 100 msec or less, 50 msec or less, 10 msec or less, 5 msec or less, 1 msec or less, 500 μsec or less, 100 μsec or less, 50 μsec or less, or 10 μsec or less, for example. In some embodiments, the at least one step transition has a rising time in a range from 1 μsec to 10 μsec, 1 μsec to 50 μsec, 1 μsec to 100 μsec, 1 μsec to 500 μsec, 1 μsec to 1 msec, 1 μsec to 1 sec, 1 μsec to 10 sec, 1 μsec to 100 sec, 10 μsec to 100 μsec, 10 μsec to 500 μsec, 10 μsec to 1 msec, 10 μsec to 1 sec, 10 μsec to 10 sec, 10 μsec to 100 sec, 100 μsec to 500 μsec, 100 μsec to 1 msec, 100 μsec to 1 sec, 100 μsec to 10 sec, 100 μsec to 100 sec, 500 μsec to 1 msec, 1 sec to 10 sec, or 1 sec to 100 sec. In some embodiments, the electric current comprises a stepped profile comprising a plurality of step transitions. In some cases, one or more (and, in some cases, all) of the step transitions of the plurality of step transitions have a rising time falling within at least one of the aforementioned ranges.

In some embodiments, the electric current comprises a stepped profile comprising at least one step transition from $I_0$ to $I_1$ where $I_1$ is at least $1.5I_0$, at least $2I_0$, at least $5I_0$, at least $10I_0$, at least $20I_0$, at least $50I_0$, or at least 100 $I_0$. In some embodiments, the electric current comprises a stepped profile comprising at least one step transition where $I_1$ is in a range from $1.5I_0$ to $2I_0$, $1.5I_0$ to $5I_0$, $1.5I_0$ to $10I_0$, $1.5I_0$ to $20I_0$, $1.5I_0$ to $50I_0$, $1.5I_0$ to $1000I_0$, $2I_0$ to $5I_0$, $2I_0$ to $10I_0$, $2I_0$ to $20I_0$, $2I_0$ to $5I_0$, $2I_0$ to $100I_0$, $5I_0$ to $10I_0$, $5I_0$ to $20I_0$, $5I_0$ to $5I_0$, $5I_0$ to $100I_0$, $10I_0$ to $20I_0$, $10I_0$ to $50I_0$, $10I_0$ to $100I_0$, $20I_0$ to $50I_0$, $20I_0$ to $100I_0$, or $50I_0$ to $100I_0$. In certain embodiments, the electric current comprises a stepped profile comprising at least one step transition from $I_0$ to $I_1$ where a difference between $I_1$ and $I_0$ has a magnitude of at least 1 µA, at least 10 µA, at least 20 µA, at least 50 µA, at least 100 µA, at least 200 µA, at least 500 µA, or at least 1000 mA. In certain embodiments, the electric current comprises a stepped profile comprising at least one step transition from $I_0$ to $I_1$ where a difference between $I_1$ and $I_0$ has a magnitude in a range from 1 µA to 10 µA, 1 µA to 20 µA, 1 µA to 50 µA, 1 µA to 100 µA, 1 µA to 200 µA, 1 µA to 500 µA, 1 µA to 1000 µA, 10 µA to 20 µA, 10 µA to 50 µA, 10 µA to 100 µA, 10 µA to 200 µA, 10 µA to 500 µA, 10 µA to 1000 µA, 20 µA to 50 µA, 20 µA to 100 µA, 20 µA to 200 µA, 20 µA to 500 µA, 20 µA to 1000 µA, 50 µA to 100 µA, 50 µA to 200 µA, 50 µA to 500 µA, 50 µA to 1000 µA, 100 µA to 200 µA, 100 µA to 500 µA, 100 µA to 1000 µA, or 500 µA to 1000 µA. In some embodiments, the electric current comprises a stepped profile comprising a plurality of step transitions having a value of $I_1$ and/or a difference between $I_1$ and $I_0$ falling within at least one of the aforementioned ranges.

II. Systems and Methods for Determining a Thermal Characteristic of a Sample

FIG. 1 is a block diagram illustrating a system for determining a thermal characteristic of a sample, in accordance with some embodiments of the technology described herein. The system includes a housing 100, a current generator 102, a voltage sensor 104, a pair of electrodes 106 and 108, a temperature sensor 112, a heater 114, a vacuum pump 116, a processor 120 and a laser source 130. It should be noted that not all the components of FIG. 1 are required in all embodiments. For example, some embodiments may lack temperature sensor 112 and/or heater 114 and/or vacuum pump 116 and/or laser source 130 and/or current generator 102 and/or voltage sensor 104.

Housing 100 may be shaped in any suitable way and may be made of any suitable material. In some embodiments, housing 100 may define a vacuum chamber. Accordingly, housing 100, when closed, may be hermetically sealed. In such embodiments, vacuum pump 116 may enable thermal measurements to be taken at a low pressure (e.g., in a vacuum). Performing measurements at low pressure may reduce convection effects, which may otherwise negatively impact the accuracy of a measurement. In some cases, performing measurements at low pressure may render convection effects negligible. In certain embodiments, the pressure within the housing during performance of one or more (or, in some cases, all) steps of methods described herein is $1\times10^6$ mTorr or less, $1\times10^5$ mTorr or less, $1\times10^4$ mTorr or less, 1000 mTorr or less, 100 mTorr or less, 10 mTorr or less, 5 mTorr or less, 2 mTorr or less, or 1 mTorr or less. In certain embodiments, the pressure within the housing during performance of one or more (or, in some cases, all) steps of methods described herein is 1 mTorr to 2 mTorr, 1 mTorr to 5 mTorr, 1 mTorr to 10 mTorr, 1 mTorr to 100 mTorr, 1 mTorr to 1000 mTorr, 1 mTorr to $1\times10^4$ mTorr, 1 mTorr to $1\times10^5$ mTorr, 1 mTorr to $1\times10^6$ mTorr, 2 mTorr to 5 mTorr, 2 mTorr to 10 mTorr, 2 mTorr to 100 mTorr, 2 mTorr to 1000 mTorr, 2 mTorr to $1\times10^4$ mTorr, 2 mTorr to $1\times10^5$ mTorr, 2 mTorr to $1\times10^6$ mTorr, 10 mTorr to 100 mTorr, 10 mTorr to 1000 mTorr, 10 mTorr to $1\times10^4$ mTorr, 10 mTorr to $1\times10^5$ mTorr, 10 mTorr to $1\times10^6$ mTorr, 100 mTorr to 1000 mTorr, 100 mTorr to $1\times10^4$ mTorr, 100 mTorr to $1\times10^5$ mTorr, 100 mTorr to $1\times10^6$ mTorr, 1000 mTorr to $1\times10^4$ mTorr, 1000 mTorr to $1\times10^5$ mTorr, 1000 mTorr to $1\times10^6$ mTorr, or $1\times10^4$ mTorr to $1\times10^6$ mTorr.

A sample is positioned to electrically contact electrodes 106 and 108, inside housing 100. The sample may be a micro-scale sample (e.g., a micro-wire) or a nano-scale sample (e.g., a nano-wire). Examples of these materials include micro/nano-fibers (e.g., graphene micro/nano-fibers). In some embodiments, micro-scale samples may be elongated in one direction and, along that direction, may have a length in the µm range (e.g., 1-1000 µm). In some embodiments, nano-scale samples may be elongated in one direction and, along that direction, may have a length in the nm range (e.g., 1-1000 nm). In some embodiments, a sample has an aspect ratio of at least 2:1, at least 3:1, at least 4:1, at least 5:1, at least 10:1, at least 20:1, at least 50:1, at least 100:1, at least 200:1, at least 500:1, or at least 1000:1. In some embodiments, the sample has an aspect ratio in a range of 2:1 to 5:1, 2:1 to 10:1, 2:1 to 20:1, 2:1 to 50:1, 2:1 to 100:1, 2:1 to 200:1, 2:1 to 500:1, 2:1 to 1000:1, 5:1 to 10:1, 5:1 to 20:1, 5:1 to 50:1, 5:1 to 100:1, 5:1 to 200:1, 5:1 to 500:1, 5:1 to 1000:1, 10:1 to 20:1, 10:1 to 50:1, 10:1 to 100:1, 10:1 to 200:1, 10:1 to 500:1, 10:1 to 1000:1, 100:1 to 200:1, 100:1 to 500:1, 100:1 to 1000:1, or 500:1 to 1000:1. As used herein, the term "aspect ratio" refers to a ratio of a length of the sample to the largest cross-sectional dimension (e.g., diameter) of the sample in a plane orthogonal to the length. In some embodiments, a sample has a length of 100 mm or less, 50 mm or less, 20 mm or less, 10 mm or less, 5 mm or less, 2 mm or less, 1 mm or less, 500 µm or less, 200 µm or less, 100 mm or less, 50 µm or less, 20 µm or less, 10 µm or less, 5 µm or less, 2 µm or less, 1 µm or less, 500 nm or less, 200 nm or less, 100 nm or less, 50 nm or less, 20 nm or less, 10 nm or less, 5 nm or less, 2 nm or less, or 1 nm or less. In some embodiments, a sample has a length in a range from 1 nm to 10 nm, 1 nm to 100 nm, 1 nm to 1 µm, 1 nm to 10 µm, 1 nm to 100 µm, 1 nm to 1 mm, 1 nm to 2 mm, 1 nm to 5 mm, 1 nm to 10 mm, 1 nm to 50 mm, 1 nm to 100 mm, 10 nm to 100 nm, 10 nm to 1 µm, 10 nm to 10 mm, 10 nm to 100 µm, 10 nm to 1 mm, 10 nm to 2 mm, 10 nm to 5 mm, 10 nm to 10 mm, 10 nm to 50 mm, 10 nm to 100 mm, 100 nm to 1 µm, 100 nm to 10 µm, 100 nm to 100 µm, 100 nm to 1 mm, 100 nm to 2 mm, 100 nm to 5 mm, 100 nm to 10 mm, 100 nm to 50 mm, 100 nm to 100 mm, 1 µm to 10 µm, 1 µm to 100 µm, 1 µm to 1 mm, 1 µm to 2 mm, 1 µm to 5 mm, 1 µm to 10 mm, 1 µm to 100 mm, 10 µm to 100 mm, 10 µm to 1 mm, 10 µm to 2 mm, 10 µm to 5 mm, 10 mm to 10 mm, 10 µm to 100 mm, 100 mm to 1 mm, 100 µm to 2 mm, 100 µm to 5 mm, 100 µm to 10 mm, 100 µm to 100 mm, 1 mm to 2 mm, 1 mm to 5 mm, 1 mm to 10 mm, 1 mm to 100 mm, 2 mm to 10 mm, 2 mm to 100 mm, or 10 mm to 100 mm. In some embodiments, a sample has a largest cross-sectional dimension (e.g., a diameter) in a plane orthogonal to the length of about 1 mm or less, 500 mm or less, 100 µm or less, 50 µm or less, 40 µm or less, 30 µm or less, 20 µm or less, 10 µm or less, 5 µm or less, 2 µm or less, 1 µm or less, 500 nm or less, 100 nm or less, 50 nm or less, 20 nm or less, 10 nm or less, 5 nm or less, 2 nm or less, or 1 nm or less. In some embodiments, a sample has a largest cross-sectional dimension (e.g., a diameter) in a plane orthogonal to the length in a range from 1 nm to 10 nm, 1 nm to 100 nm, 1 nm to 1 µm, 1 nm to 10 µm, 1 nm to 100 µm, 1 nm to 1 mm, 10 nm to 100 nm, 10 nm to 1 µm, 10 nm to 10 µm, 10 nm to 100 µm, 10 nm to 1 mm, 100 nm to 1 µm, 100 nm to 10 µm, 100 nm to 100 µm, 100 nm to 1 mm, 1 µm to 10 µm, 1 µm to 100 µm, 1 µm to 1 mm, 10 mm to 100 µm, 10 µm to 1 mm, or 100 mm to 1 mm. However, the techniques described herein are not limited to use with elongated samples, and may be used to characterize samples of other shapes as well.

A first portion of sample 10 is coupled to electrode 106 and a second portion of sample 10 is coupled to electrode 108. In some embodiments, opposite ends of sample 10 rest on the electrodes, while the middle portion of sample 10 is suspended in air. In this way, thermal contact to other parts of housing 100—which may otherwise skew the electrothermal characterization—may be reduced. In some embodiments, conductive paste 110 (e.g., a silver paste) is applied to the joints to improve electrical and/or thermal connections between the sample and the electrodes.

Figure 2B:
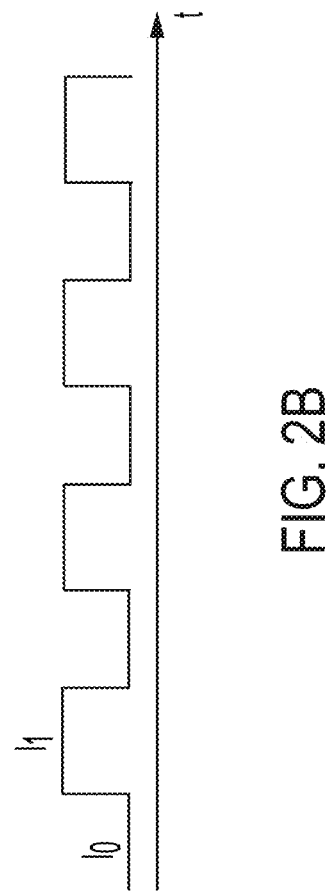
FIG. 2B is a plot illustrating an electric current having multiple step transitions, in accordance with some embodiments of the technology described herein.
Figure 2A:
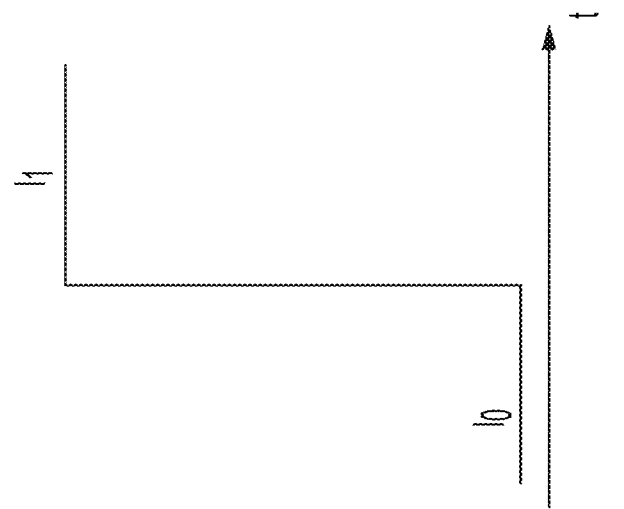
FIG. 2A is a plot illustrating an electric current having a step transition, in accordance with some embodiments of the technology described herein.

The sample may be heated via Joule effect (e.g., using current generator 102), via optical absorption (e.g., using laser source 130), or via other thermal mechanisms. Current generator 102 may be coupled to electrode 106 and electrode 108. Thus, electric current generated by current generator 102 may flow through sample 10. Processor 120 controls the operation of current generator 102. Processor 120 may include a single processing unit or multiple processing units. Multiple processing units may be part of a common computer, a network of computers, or a cloud. Processor 120 may include a digital-to-analog converter (DAC) interfacing with current generator 120. In some embodiments, processor 120 controls current generator 102 to produce electric current with a stepped profile. FIGS. 2A-2B are plots illustrating examples of stepped profile currents. The current of FIG. 2A includes one step transition—from $I_0$ to $I_1$. In some embodiments, $I_0$ may be zero. The rise time of the transition from $I_0$ to $I_1$ may be selected on the basis of the expected thermal response of the sample. For example, for samples having a relatively fast thermal response, the rise time should be set to relatively low values (e.g., less than 100 μsec or less than 10 μsec). For samples having a relatively slow thermal response, the rise time may be relaxed (e.g., less 1 msec). Both the Joule effect and heat conduction from the sample to the electrodes influence the speed at which the temperature of the sample varies. As discussed in detail further below, the stepped current of FIG. 2A causes a transient voltage across the sample, which may be evaluated to determine a thermal characteristic of a sample. The current of FIG. 2B includes multiple step transitions. In some embodiments, allowing multiple step transitions to flow through a sample may enable multiple measurements. When averaged, the results of these multiple measurements may improve the overall accuracy of the characterization relative to a single measurement.

In some embodiments, instead of (or in addition to) using current generator 102, laser source 130 may be used to cause a temperature change in the sample. Laser source 130 may be controlled to irradiate the sample (in part or in its entirety), which in turn produces a temperature variation in the sample due to optical absorption—absorbed photons produce phonons. Processor 120 controls the operation of laser source 130. The intensity of the light emitted by the laser source may have a stepped profile (similar to FIGS. 2A-2B) or other profiles. When laser source 130 is used to cause a temperature change in the sample, current generator 102 may generate a DC current. In certain embodiments, for example, a DC current may be passed through sample 10 to detect a voltage change.

Referring back to FIG. 1, voltage sensor 104 senses voltages (transient and steady-state) arising between electrode 106 and electrode 108. A voltage may arise between electrodes 106 and 108 as a result of electric current flowing through sample 10 and/or as a result of optical absorption. The sensed voltage may be communicated to processor 120 for further processing, as discussed below.

In some embodiments, the system may include a temperature sensor 112, such as a thermocouple. Temperature sensor 112 may be positioned to sense the temperature of sample 10 as electric current flows through it and/or as it absorbs photons from a laser source. Further, in some embodiments, the system may include a heater 114. Heater 114 may be positioned to increase the temperature of the sample when the heater produces heat. The inventors have recognized that sensing the temperature of the sample may be beneficial in some embodiments as the thermal characteristic to be determined may be temperature-dependent. Thus, some embodiments involve characterizing a sample at various temperatures. This may be accomplished by ramping the heat produced by heater 114 and by reconstructing the thermal characteristic vs. temperature behavior of the sample. The temperature of the sample may be varied to cover the range of 1 to 273 degrees Kelvin, 1 to 293 degrees Kelvin, 1 to 373 degrees Kelvin, 1 to 800 degrees Kelvin, 1 to 1000 degrees Kelvin, 1 to 1500 degrees Kelvin, 10 to 273 degrees Kelvin, 10 to 293 degrees Kelvin, 10 to 373 degrees Kelvin, 10 to 800 degrees Kelvin, 10 to 1000 degrees Kelvin, 10 to 1500 degrees Kelvin, 100 to 273 degrees Kelvin, 100 to 293 degrees Kelvin, 100 to 373 degrees Kelvin, 100 to 800 degrees Kelvin, 100 to 1000 degrees Kelvin, 273 to 373 degrees Kelvin, 273 to 800 degrees Kelvin, 273 to 1000 degrees Kelvin, 273 to 1500 degrees Kelvin, 373 to 800 degrees Kelvin, 373 to 1000 degrees Kelvin, 373 to 1500 degrees Kelvin, or 800 to 1500 degrees Kelvin, for example, or any subrange within that range. In some embodiments, the lower end of these temperature ranges may be achieved using liquid nitrogen/He coolers.

Figure 3A:
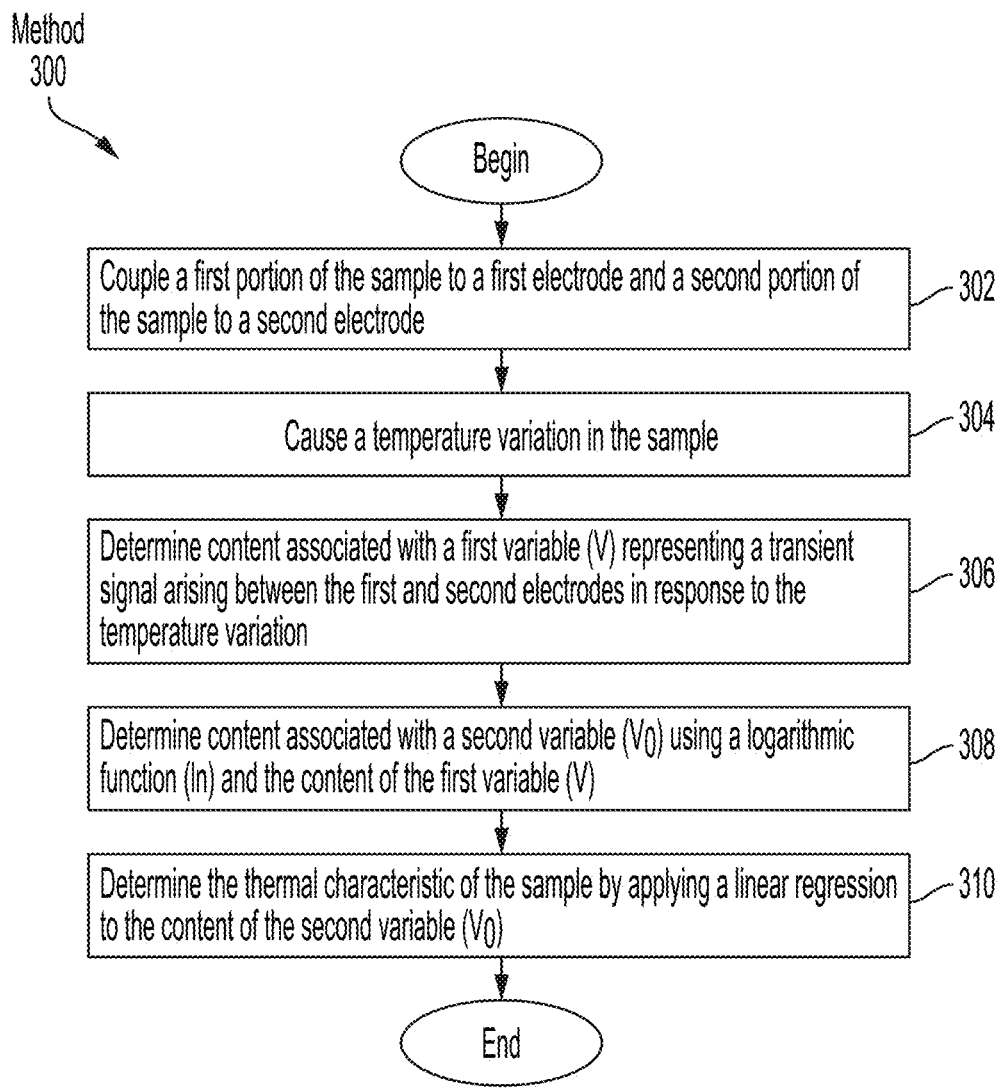
FIG. 3A is a flow chart illustrating a method for determining a thermal characteristic of a sample, in accordance with some embodiments of the technology described herein.

FIG. 3A is a flow chart illustrating a method for determining a thermal characteristic of a sample, in accordance with some embodiments of the technology described herein. Method 300 may be executed using the system of FIG. 1, or using other systems. Method 300 may involve a set up stage and a testing stage. The setup stage includes step 302. The testing stage includes steps 304-310.

Method 300 begins at step 302, in which a user couples a first portion of a sample to a first electrode (e.g., electrode 106) and a second portion of the sample to a second electrode (e.g., electrode 108). The electrodes may be made of a highly thermally conductive material (e.g., copper, aluminum). The user may clamp the electrodes, for example using small silicon pieces. Alternatively, the two electrodes may be clamped with metal pieces. This may reduce the thermal and electrical contact resistances to levels that become negligible. In some embodiments, the user may apply a conductive paste (e.g., silver paste) to the first and second electrodes to further improve the electric and thermal contact between the electrodes and the sample.

In some embodiments, the sample is placed in a vacuum (e.g., a pressure less than 2 mTorr) and air may be manipulated to mimic the working environment of the sample. In some embodiments, a processor (e.g., processor 120) controls a heater (e.g., heater 114) to set the initial temperature of the sample to a desired value. The processor may use a temperature reading obtained from a temperature sensor (e.g., temperature sensor 112) to control the heater in a close-looped fashion. In some embodiments, the processor may vary the heat produced by the heater to allow the system to take measurements at different temperatures.

At step 304, the processor causes a temperature variation in the sample. In some embodiments, the temperature variation may be caused by controlling a current generator (e.g., current generator 102) to generate an electric current. The current generator is coupled to the electrodes described in step 302. As a result, the electric current generated by the current generator flows through the sample. The current flowing through the sample may produce heat via the Joule effect, thus causing a temperature variation in the sample. In some embodiments, the electric current may have a stepped profile (e.g., may include one or more step transitions, as shown in the examples of FIGS. 2A-2B).

Additionally, or alternatively, the temperature variation may be caused by controlling a laser source (e.g., laser source 130) to irradiate the sample, in part or in its entirety.

In some embodiments, current generation and/or optical absorption may cause a temperature variation (e.g., a temperature rise) of at least about 1 K, at least about 2 K, at least about 5 K, at least about 10 K, at least about 20 K, or at least about 50 K. In some embodiments, current generation and/or optical absorption may cause a temperature variation (e.g., a temperature rise) of about 50 K or less, about 20 K or less, about 10 K or less, about 5 K or less, about 2 K or less, or about 1 K or less. In some embodiments, current generation and/or optical absorption may cause a temperature change (e.g., a temperature rise) in a range from 1 K to 2 K, 1 K to 5 K, 1 K to 10 K, 1 K to 20 K, 1 K to 50 K, 2 K to 5 K, 2 K to 10 K, 2 K to 20 K, 2 K to 50 K, 5 K to 10 K, 5 K to 20 K, 5 K to 50 K, 10 K to 20 K, 10 K to 50 K, or 20 K to 50 K.

At step 306, the processor determines content associated with a first variable representing a transient signal arising between the first and second electrodes in response to the temperature variation. In some embodiments, step 306 involves sensing a voltage arising between the first and second electrodes over time (for example using voltage sensor 104), digitizing the sensed voltage using the processor, determining what portion of the digitized voltage represents the transient region, and associating the digital information representing the transient voltage to the first variable using the processor. In some embodiments, determining the transient region of the voltage involves determining that the rate of voltage change exceeds a threshold rate (e.g., is more than 1 µV/sec, such as between 1 µV/sec and 100 mV/sec). The threshold rate may be set depending on the material of the sample and the current level. An example of the first variable is discussed in detail further below in connection with FIG. 4A. In that example, the first variable is referred to as "V." The transient voltage has a time-varying behavior that depends on the applied current (and/or the light intensity) as well as the thermal characteristics of the sample. The thermal characteristics of the sample (e.g., thermal diffusivity) determine the rate of temperature variation in the sample. The temperature variation, in turn, produces a change in the resistivity of the sample, thereby changing the voltage/current ratio.

In some embodiments, the transient signal arising between the first and second electrodes in response to the temperature variation may be a transient current, as not all embodiments are limited to transient voltages. For example, the transient current may arise in response to application of stepped voltage, or may arise in response to a stepped laser pulse.

Figure 3B:
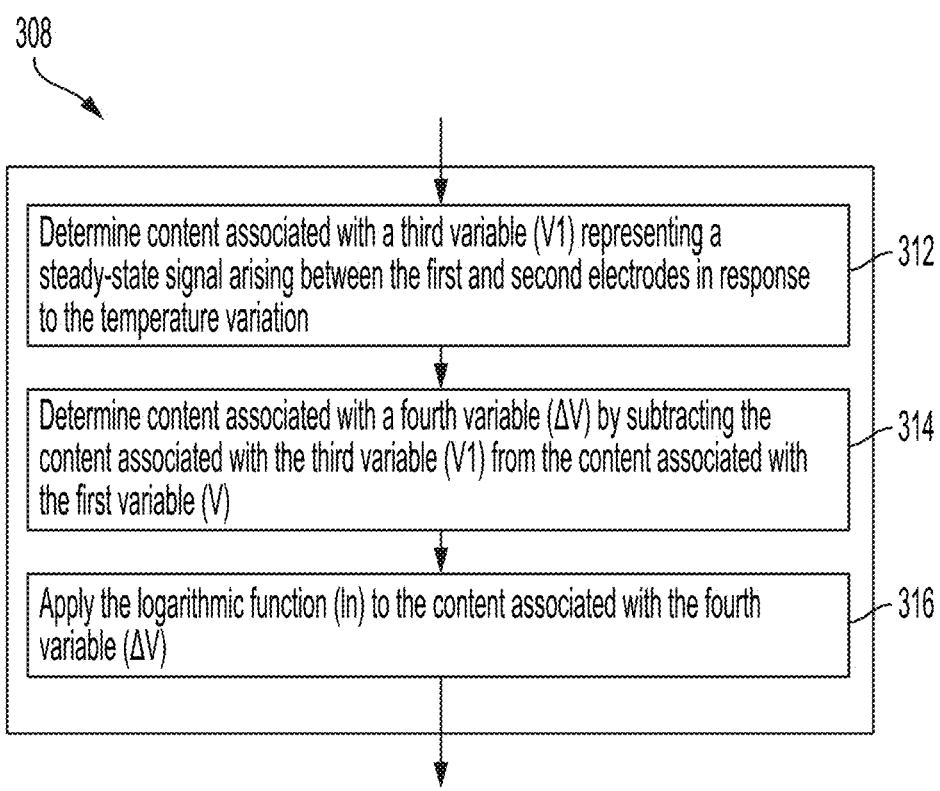
FIG. 3B is a flow chart illustrating sub-steps that may be executed as part of step 308 of the method of FIG. 3A, in accordance with some embodiments of the technology described herein.

At step 308, the processor determines content associated with a second variable using a logarithmic function and the content of the first variable. An example of the second variable is discussed in detail further below in connection with FIG. 4B. In that example, the second variable is referred to as "$V_0$." In some embodiments, step 308 involves sub-steps 312-316, which are illustrated in FIG. 3B.

At sub-step 312, the processor determines content associated with a third variable representing a steady-state signal arising between the first and second electrodes in response to the temperature variation. In some embodiments, sub-step 312 involves determining what portion of the digitized voltage represents the steady-state region, and associating the digital information representing the steady-state voltage to a third variable using the processor. In some embodiments, determining the steady-state region of the voltage involves determining that the rate of voltage change is below the threshold rate. Accordingly, the steady-state voltage may represent the continuation of the transient voltage, beginning where the rate of voltage change is below the threshold rate. An example of the third variable is discussed in detail further below in connection with FIG. 4A. In that example, the third variable is referred to as "$V_1$."

In some embodiments, the steady-state signal arising between the first and second electrodes in response to the temperature variation may be a steady-state current, as not all embodiments are limited to steady-state voltages. For example, the steady-state current may arise in response to application of stepped voltage, or may arise in response to a stepped laser pulse.

At sub-step 314, the processor determines content associated with a fourth variable by subtracting the content associated with the third variable from the content associated with the first variable. An example of the fourth variable is discussed in detail further below in connection with FIG. 4B. In that example, the fourth variable is referred to as "$\Delta V$." In some embodiments, sub-step 314 involves performing the operation $V-V_1$ (or $V_1-V$).

At sub-step 316, the processor applies the logarithmic function to the content associated with the fourth variable to determine the content of the second variable. In some embodiments, the logarithmic function may be a natural logarithmic function. Sub-step 316 involves performing the operation $\ln(V-V_1)$ (or more generally $\log(V-V_1)$) and associating the result of this operation to the second variable ($V_0$). The inventors have recognized and appreciated that by applying a logarithmic function to the content associated with the fourth variable, it is possible to accurately characterize the sample using a linear regression. In some embodiments, a linear regression is more desirable than a non-linear regression in that a linear regression enables a more precise estimate of the thermal characteristic of interest as well as a more precise estimate of the uncertainty associated with the regression. Accordingly, at step 310 (FIG. 3A), the processor determines a thermal characteristic of the sample by applying a linear regression to the content of the second variable. It should be noted that this computation is relatively independent of the boundary conditions of the regression. Thus, unlike for non-linear regressions, it is less important whether the beginning of time interval in which the regression is performed is set to t=0 sec, t=0.05 sec or t=0.1 sec, as an example. In the context of non-linear regressions, the beginning of the time interval in which the regression is performed can impact the result significantly due to the presence of noise. In other words, in this context, linear regressions are less susceptible to noise than non-linear regressions.

The thermal characteristic determined at step 310 may be the thermal diffusivity, the thermal conductivity and/or the specific heat of the sample.

In some embodiments, the content of the second variable (e.g., $V_0 = \ln(V-V_1)$) over time is fit to a line of Equation 1:

$$V_0 = \ln(V - V_1) = -\frac{A\alpha}{L^2}t + D$$

where A represents a constant, L represents the length of the sample, α represents the thermal diffusivity of the sample, and D represents another constant. The slope of the linear fit can be represented by Equation 2:

$$\text{slope} = -A\alpha/L^2$$

Thus, thermal diffusivity a may be obtained from the slope of the linear fit. The thermal conductivity or the specific heat may be obtained directly from the thermal diffusivity using Equation 3:

$$\alpha = \frac{\kappa}{\rho c_P}$$

where κ represents the thermal conductivity, p represents the density and $c_P$ represents the specific heat capacity.

In some embodiments, the processor may further determine a value representing an uncertainty associated with the determined thermal characteristic using the linear regression. Determining the uncertainty may be useful in that it provides an indication as to the degree of confidence in determining the thermal characteristic. In some embodiments, the uncertainty associated with the determined thermal characteristic is at least one order of magnitude, at least two orders of magnitude, or at least three orders of magnitude lower than the thermal characteristic value. In certain embodiments, the uncertainty associated with the determined thermal characteristic is $1\times10^{-7}$ m²/s or less, $5\times10^{-8}$ m²/s or less, $1\times10^{-8}$ m²/s or less, $5\times10^{-9}$ m²/s or less, $2.5\times10^{-9}$ m²/s or less, $2\times10^{-9}$ m²/s or less, or $1\times10^{-9}$ m²/s or less. In certain embodiments, the uncertainty associated with the determined thermal characteristic is in a range from $1\times10^{-9}$ m²/s to $2\times10^{-9}$ m²/s, $1\times10^{-9}$ m²/s to $2.5\times10^{-9}$ m²/s, $1\times10^{-9}$ m²/s to $5\times10^{-9}$ m²/s, $1\times10^{-9}$ m²/s to $1\times10^{-8}$ m²/s, $1\times10^{-9}$ m²/s to $5\times10^{-8}$ m²/s, or $1\times10^{-9}$ m²/s to $1\times10^{-7}$ m²/s, $2\times10^{-9}$ m²/s to $5\times10^{-9}$ m²/s, $2\times10^{-9}$ m²/s to $1\times10^{-8}$ m²/s, $2\times10^{-9}$ m²/s to $5\times10^{-8}$ m²/s, or $2\times10^{-9}$ m²/s to $1\times10^{-7}$ m²/s.

Figure 4A:
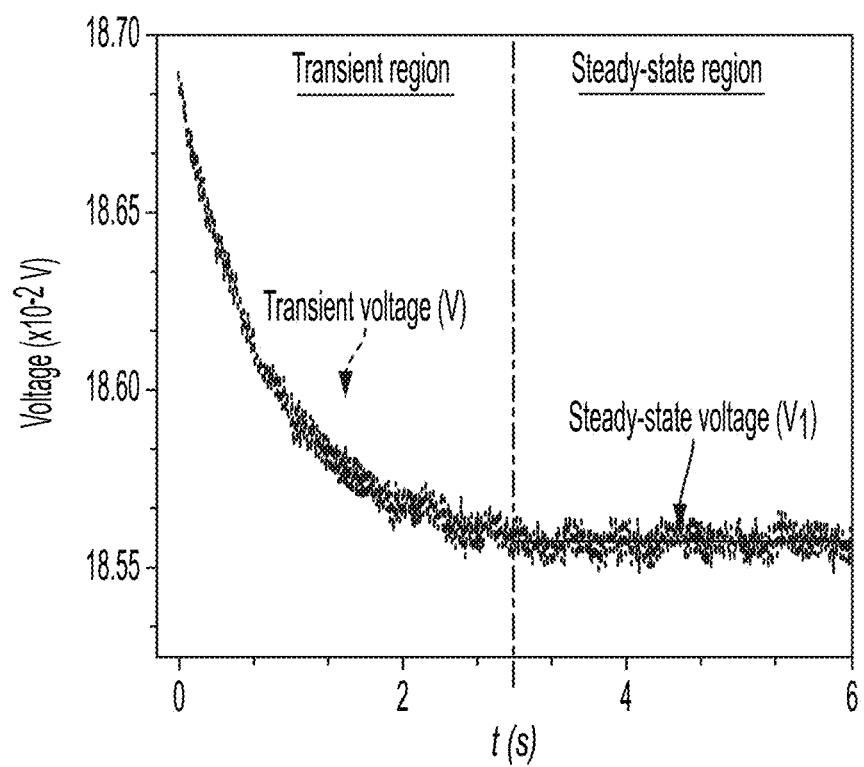
FIG. 4A is a plot illustrating the voltage appearing across the sample upon application of the electric current of FIG. 2A, in accordance with some embodiments of the technology described herein.

FIG. 4A is a plot representing a voltage arising between electrodes 106 and 108 in response to the stepped current depicted in FIG. 2A as a function of time, in accordance with some embodiments of the technology described herein. As can be appreciated from FIG. 4A, the voltage includes a transient region and a steady-state region. The transient voltage is defined in the transient region and the steady-state voltage is defined in the steady-state region. In the transient region, the voltage decreases at a relatively large rate as a result of a change in the resistivity of the sample, which in turn is caused by the current. As the voltage approaches the steady-state region, the rate of change decreases. In the steady-state region, the voltage is substantially constant. The boundary between the transient region and the steady-state region lies, for example, at the time when the rate of voltage change equals a certain threshold rate. In some embodiments, the threshold rate is 100 μV/sec or less, 50 μV/sec or less, 20 μV/sec or less, 10 μV/sec or less, 5 μV/sec or less, 2 μV/sec or less, or 1 μV/sec or less. In some instances, the steady-state voltage is obtained by averaging the voltage values in the steady-state region. When digitized, the transient voltage represents the content associated with a variable named "V," and the steady-state voltage represents the content associated with a variable named "$V_1$."

Figure 4B:
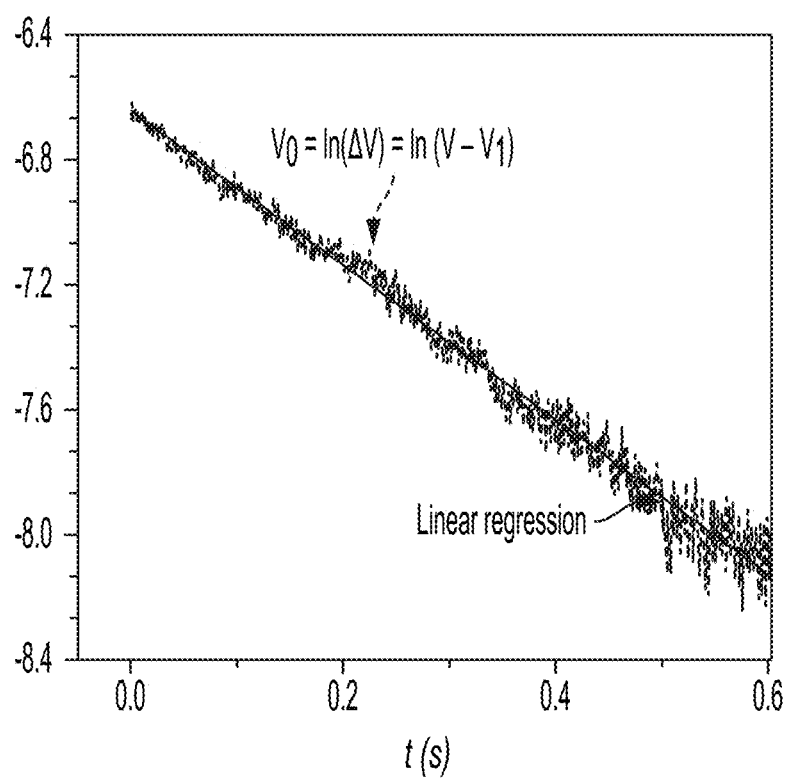
FIG. 4B is a plot illustrating the voltage of FIG. 4A upon application of a logarithmic function, in accordance with some embodiments of the technology described herein.

FIG. 4B is a plot illustrating the voltage of FIG. 4A upon application of a logarithmic function, in accordance with some embodiments of the technology described herein. More specifically, the plot illustrates the content associated with the variable $V_0$, where $V_0 = \ln(\Delta V)$. The content associated with the variable "$\Delta V$," in turn, equals $V - V_1$ (or $V_1 - V$). As can be appreciated from FIG. 4B, the result of the logarithmic operation described above results in a substantially linear function. As a result, the function can be appropriately fitted using a linear regression.

In some embodiments, the transient voltage and steady-state voltage are measured over a total time of about 1 minute or less, 30 seconds or less, 20 seconds or less, 10 seconds or less, 5 seconds or less, 2 seconds or less, 1 second or less, 0.8 seconds or less, 0.6 seconds or less, 0.4 seconds or less, 0.2 seconds or less, 0.1 second or less, or 20 milliseconds or less.

Example 1

In this Example, the methods and systems described above were used to heat a graphene fiber sample using Joule heating and to characterize a thermal characteristic of the graphene fiber sample.

Theoretical Study

Figure 8B:
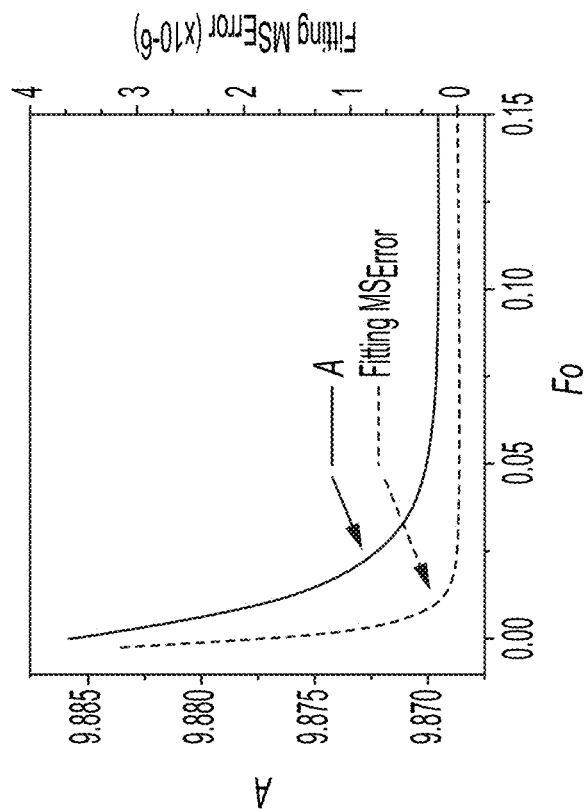
FIG. 8B is a plot illustrating the slope A and uncertainty as a function of the quantity Fo, in accordance with some embodiments of the technology described herein.
Figure 8A:
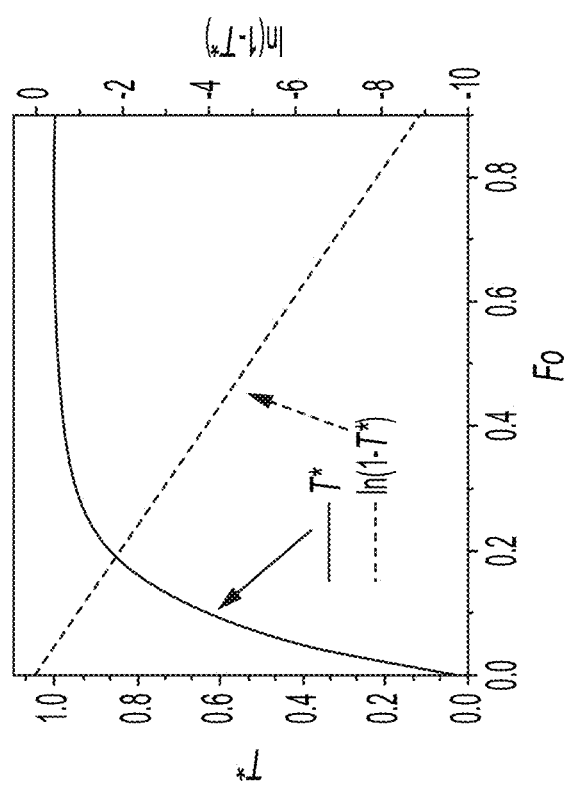
FIG. 8A is a plot illustrating the quantities $T^*$ and $\ln(1-T^*)$ as a function of the quantity Fo, in accordance with some embodiments of the technology described herein.

Initially, a theoretical study of transient temperature change in a graphene fiber sample due to Joule heating was performed. The heat conduction in the sample was assumed to be one-dimensional due to the high aspect ratio of the sample. Thermal diffusivity of the sample was calculated using the one-dimensional heat transfer model and the transient temperature response, according to Equation 4:

$$T^* = \frac{96}{\pi^4} \sum_{m=1}^{\infty} \frac{1 - \exp\left[-\frac{(2m-1)^2 \pi^2 \alpha t}{L^2}\right]}{(2m-1)^4}$$

where T* is a dimensionless temperature rise that is normalized by the steady-state temperature increase under the same Joule heating. This temperature rise was averaged over the whole length of the sample. When the time is normalized to the Fourier number, for any material with any length, Equation 4 shows that the normalized temperature rise follows the same form with regard to Fo. The left axis of FIG. 8A depicts the calculated T* versus Fo based on Equation 4. For the theoretical study, the length of the sample was 2 mm, and the thermal diffusivity was $9\times10^{-7}$ m²/s. In FIG. 8A, it is shown that after Fo=0.3, T* reached the value of 0.95. The right axis of FIG. 8A shows ln(1−T*) versus Fo. It was recognized that there was a substantially linear relationship between ln(1−T*) values and Fo, and it was deduced that the physical model for the non-dimensional temperature had the form of Equation 5:

$$T^* = 1 - B\exp\left(-\frac{A\alpha t}{L^2}\right)$$

Thus, it was recognized that the physical model for non-dimensional temperature had the form of Equation 6:

$$\ln(1 - T^*) = \ln(B) - \frac{A\alpha t}{L^2}$$

where B is a constant. Normalizing time to the Fourier number results in Equation 7:

$$\ln(1-T^*) = \ln(B) - A \cdot Fo$$

where "−A" is the slope of the straight line and Fo is the Fourier number, as represented by Equation 8:

$$Fo = \frac{\alpha t}{L^2} \qquad 5$$

Although ln(1−T*) resembled a line, the initial data points exhibited some non-linear characteristics before becoming a completely straight line. The value of A was calculated to determine how much time it took from the beginning of the data series for deviation from a straight line to diminish. The left axis of FIG. 8B shows the variation of A with respect to Fo, and it can be seen that the value of A varied with the starting point for the fitting until a certain point, after which it reached a constant value of $\pi^2$. Based on the left axis of FIG. 8B, without any data exclusion from the beginning (i.e., considering all data for the fitting), A was determined to be 9.885. The right axis of FIG. 8B shows the fitting mean square error ($MS_{Error}$) with respect to Fo. $MS_{Error}$ is defined according to Equation 9:

$$\sum_{i=1}^{n} \frac{(Y_{fit} - Y_{act})^2}{n}$$

where n is the number of data points, $Y_{fit}$ are the result of fitting for every point, and $Y_{act}$ are the values of ln(1−T*) taken from the calculation of Equation 4. Based on FIG. 8B, after Fo=0.009 (or T*=0.1), the $MS_{Error}$ value approached its minimum value to a great extent. Thus, for the fitting with the exclusion of the data before T*=0.1, a value of 9.877 was obtained for coefficient A. Comparing A=9.877 with $\pi^2$ resulted in less than 0.07% difference. Thus, for the experimental studies, data before T*=0.1 was excluded, and A was taken as $\pi^2$.

Experimental Study

A hydrothermal method was used to produce graphene fibers. First, an amount of graphene oxide having a concentration of 30 mg/mL was mixed with deionized water to form an aqueous suspension of graphene oxide. Then, the suspension was placed into an ultrasonic bath for one hour to achieve a homogeneous suspension. Next, the suspension was injected into glass pipes with an inner diameter of 0.4 mm and a length of 10 cm. After sealing both ends of the pipes, the pipes were baked for two hours at 230° C. After extraction from the pipes, high quality graphene fibers having a diameter of 20-30 μm diameter were produced.

One graphene fiber having a length of 1959 μm and a diameter of 28.2 μm was selected for electrothermal characterization. The selected graphene fiber sample was placed on two electrodes. Two electric wires were used to connect to the ends of the sample to monitor the voltage variation during the experiment. Silver paste was applied to the joints to provide good electrical and thermal connections between the graphene fiber sample, the electrodes, and the wires. To make the convection effect negligible, the experimental setup was placed in a vacuum chamber capable of reaching a vacuum level of less than 2 mTorr. The resistance of the sample was measured to be 3.71 kΩ, and a step DC current of 50 μA was fed to the sample. The value of the step current was chosen such that the transient phase of voltage change (temperature rise) was reasonable, and the temperature rise was moderate to avoid sample structural damage.

In the theoretical study, it was found that there was a strong linear relation between ln(1−T*) and Fo (or time). This finding was used to establish a link between normalized temperature and voltage using Equation 10:

$$T^* = \frac{(V_i - V)}{(V_i - V_1)}$$

where $V_i$ is the voltage at the beginning of the step current and $V_1$ is the steady-state voltage. Due to minor fluctuations that exist even after the voltage has become study, the voltages were averaged out for the steady state interval to determine the $V_1$ value for data analysis.

Taking the natural logarithm of Equation 10 resulted in Equation 11:

$$\ln(V-V_1)=\ln(1-T^*)+C$$

where C is a constant. Equation 1 was then obtained by substituting ln(B)−AFo for ln(1−T*) (based on Equation 6) and $$Fo = \frac{\alpha t}{L^2}$$

(based on Equation 8). Thus, with experimental voltage data and a specified $V_1$, fitting was performed.

FIG. 4A shows a plot of voltage as a function of time for the graphene fiber sample. Steady-state voltage $V_1$ was identified and subtracted from transient voltage V to obtain $\Delta V=V-V_1$. The natural log of $\Delta V$ was then obtained. FIG. 4B shows a plot of $V_0=\ln \Delta V=\ln (V-V_1)$ as a function of time. After T*=0.8, the fluctuations of ln(V−$V_1$) around the hypothetical line intensified greatly, so data after T*=0.8 was excluded from the fitting.

Moreover, although there was strong linearity in this graph, it was also recognized that there was nonlinearity at the beginning of the ln(1−T*)~Fo relation. It was recognized that to be able to use A=$\pi^2$ in the fitting of experimental data, a part of the data from the beginning should be excluded in the fitting process. Therefore, the linear fitting was obtained for three different cases: (1) no cut; (2) first cut from T*=0.05; and (3) first cut from T*=0.1. The corresponding values for the thermal diffusivity were 9.62×10$^{-7}$ m$^2$/s, 9.62×10$^{-7}$ m$^2$/s, and 9.61×10$^{-7}$ m$^2$/s.

The convection heat transfer in the sample was considered negligible during the measurements since the measurements were performed in a vacuum chamber. The radiation effect on the measured thermal diffusivity, however, was evaluated using Equation 12:

$$\frac{16\epsilon\sigma T^3 L^2}{\pi^2 D\rho c_p}$$

where ε is emissivity and a is the Stefan-Boltzmann constant. For the graphene fiber sample of this Example, ε was considered to be 1 and T was the room temperature during the test, which was about 295 K. The $\rho c_p$ of the graphene fiber sample was about 1.5×10$^6$ Jm$^{-3}$K$^{-1}$, and the calculated value for the radiation effect was 2.15×10$^{-7}$ m$^2$/s. Subtracting this value from a resulted in the following thermal diffusivity values for the cases of no cut, first cut from T*=0.05, and first cut from T*=0.1: 7.47×10$^{-7}$ m$^2$/s, 7.47×10$^{-7}$ m$^2$/s, and 7.46×10$^{-7}$ m$^2$/s respectively. The standard errors of the calculated a value for these three cases were ±1.75×10$^{-9}$ m$^2$/s, ±1.86×10$^{-9}$ m$^2$/s, and ±1.97×10$^{-9}$ m$^2$/s, respectively. These standard errors represented uncertainties of fitting and did not include the uncertainty of other factors, such as length and voltage measurement.

Thus, it was uncovered that there is a significant linear relation between ln(1−T*) and time, which was employed for linear data fitting. It was shown that doing the linear fitting for ln(1−T*) with respect to Fo gave a value of about $\pi^2$ for the slope (coefficient A) after excluding the initial data before T*=0.1. However, even considering all the data, the value obtained for coefficient A only deviated from $\pi^2$ by 0.15%. The value of $\pi^2$ was then used for the experimental data fitting to obtain the thermal diffusivity of the sample. The thermal diffusivity of the graphene fiber using this method was measured to be 9.61×10$^{-7}$ m$^2$/s±1.97×10$^{-9}$ m$^2$/s using the data between T*=0.1 and 0.8. The real thermal diffusivity value after radiation effect subtraction was 7.46×10$^{-7}$ m$^2$/s.

Example 2

Figure 5A:
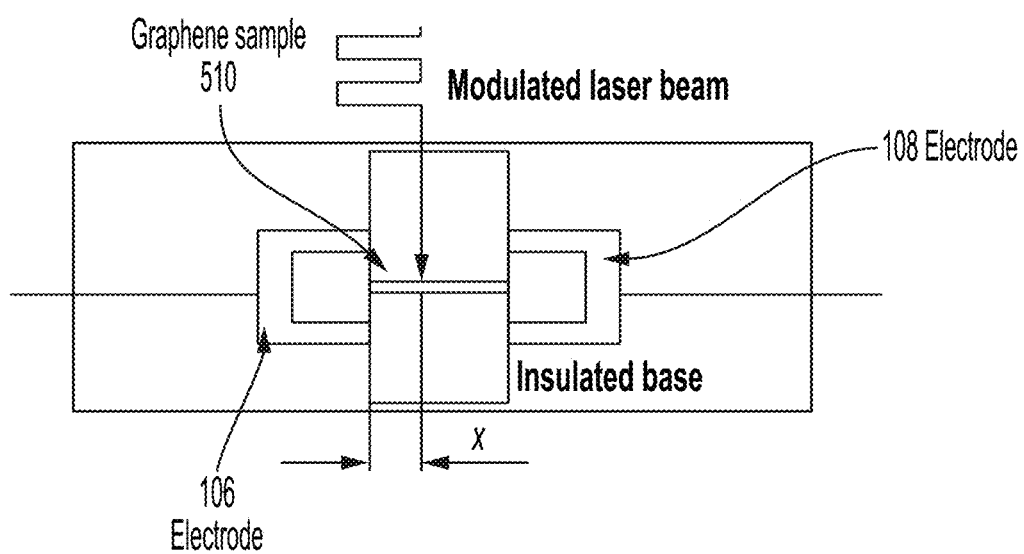
FIG. 5A is a schematic diagram of a portion of the setup used to characterize graphene samples, in accordance with some embodiments of the technology described herein.

In this Example, a graphene fiber was heated with a step laser irradiation instead of a step current. FIG. 5A is a schematic diagram of a portion of the setup used to characterize a graphene sample in this Example. The graphene sample was suspended between two electrodes, and a step continuous wave (CW) laser irradiated the entire sample uniformly. As the temperature of the sample rose as a result of absorption of the laser radiation, the resistance of the sample changed, and a transient change of voltage occurred through the sample. A low direct current (DC) current was passed through the sample to detect the voltage change during the experiment. The transient voltage was used to determine the thermal diffusivity of the sample using the techniques described above.

The temperature distribution in a 1-D wire/fiber can be described according to Equation 13:

$$T(x, t) = T_0 + \frac{\alpha}{\kappa} \int_{\tau=0}^{t} \int_{x'=0}^{L} q_0 G_{X11} dx' d\tau$$

where $T_0$ is the temperature of the electrode (e.g., room temperature), k is the thermal conductivity of the sample, $q_0$ is the heating power per unit volume, and $G_{X11}$ is the Green's function, which can be expressed according to Equation 14:

$$G_{X11}(x, t|x', t) = \frac{2}{L} \sum_{m=1}^{\infty} \exp\left[m^2\pi^2\alpha(t-\tau)/L^2\right] \sin\left(m\pi\frac{x}{L}\right) \sin\left(m\pi\frac{x}{L}\right)$$

In this Example, the scenario in which a laser heats up the sample at a certain location was studied. It was assumed that a lined laser spot size of l width irradiated the sample at location x from the beginning of the sample. Thus, the dimensionless temperature was obtained according to Equation 15:

$$T^* = \frac{1}{Z}\sum_{m=1}^{\infty}\left\{\frac{\cos\left[\frac{(2m-1)\pi x}{L}\right] - \cos\left[\frac{(2m-1)\pi(x+l)}{L}\right]}{(2m-1)^4}\right.$$

$$\left.\left[1 - \exp\left[-\frac{(2m-1)^2\pi^2\alpha^2 t}{L^2}\right]\right]\right\}$$

where Z is defined according to Equation 16:

$$Z = \sum_{m=1}^{\infty}\left\{\frac{\cos\left[\frac{(2m-1)\pi x}{L}\right] - \cos\left[\frac{(2m-1)\pi(x+l)}{L}\right]}{(2m-1)^4}\right\}$$

Figure 5B:
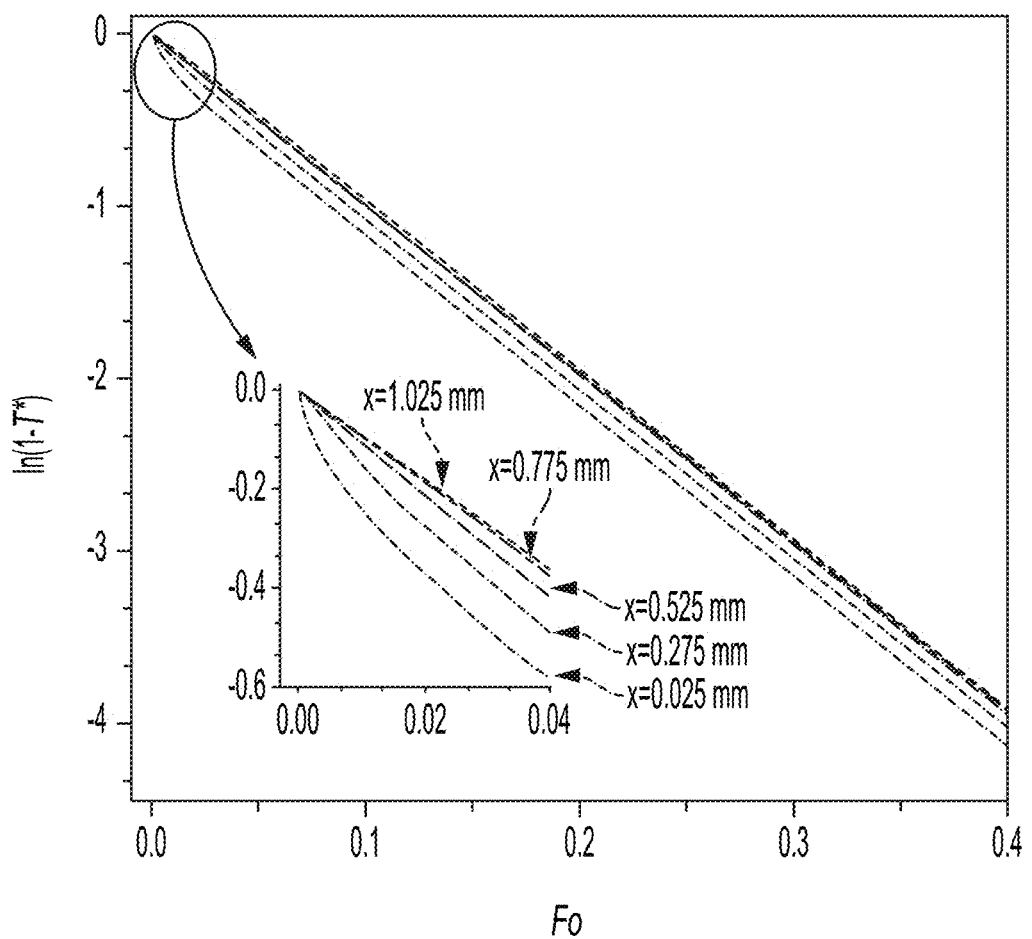
FIG. 5B is a plot illustrating the quantity $\ln(1-T^*)$ as a function of the quantity Fo, in accordance with some embodiments of the technology described herein.

The equation for T* (i.e., Equation 15) was then solved for different locations where the line laser beam irradiated the sample, with the corresponding results of ln(1−T*) vs. Fo shown in FIG. 5B. The length of the sample was 2 mm, and the thermal diffusivity was 9×10$^{-7}$ m$^2$s$^{-1}$. As can be seen, for different locations of the laser spot, it took some time for the curves to become completely linear. The extent of this nonlinearity, however, was different for each different laser spot location. Also, as shown in the inset of FIG. 5B, the level of nonlinearity was considerable when the laser spot location was near the edges of the sample and electrodes. The non-linearity was reduced as the laser spot moved closer to the middle of the sample. As can be further appreciated, after a certain time, all the curves became fully linear following the same slope.

Figure 5C:
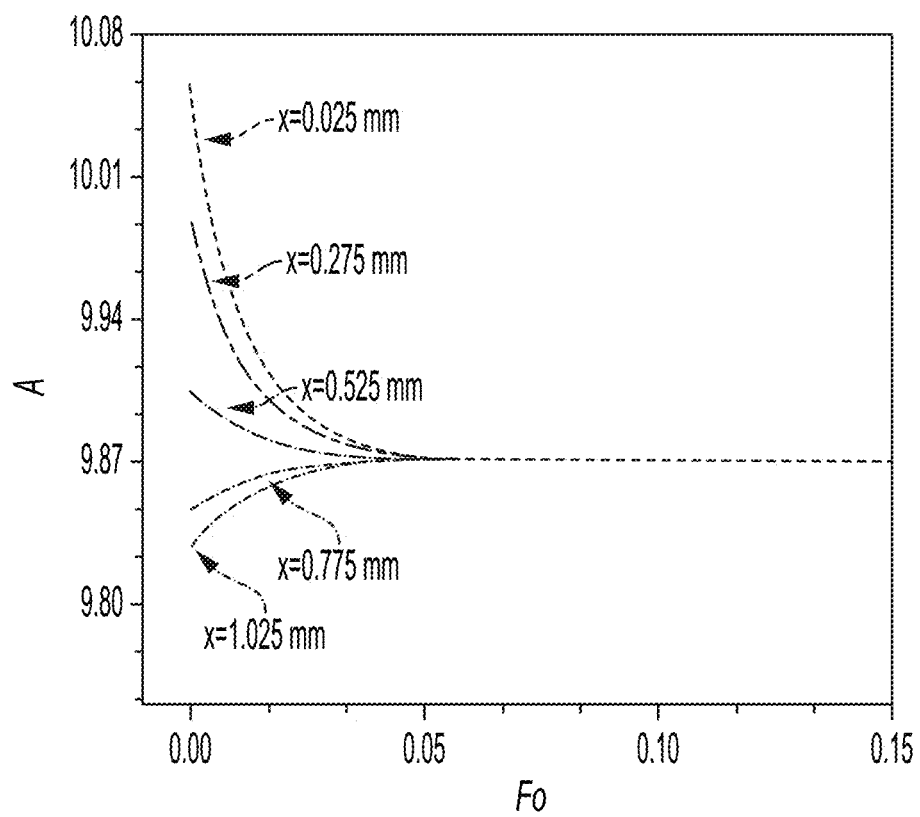
FIG. 5C is a plot illustrating the slope A as a function of the quantity Fo, in accordance with some embodiments of the technology described herein.

FIG. 5C represents the values of the slope A as a function of Fo, with the exclusion of some nonlinear data from the beginning. As can be appreciated from this figure, the variation of A vs. Fo differed for different locations where the laser irradiated the sample. The closer the laser spot was to the ends of the sample, the more the curves deviated from linearity. Moreover, the initial deviation of the A coefficient from the constant value of $\pi^2$ was weaker for the laser locations of about 0.25L (x=0.5 mm) to 0.75L (x=1.5 mm) (L: sample's length), and the difference was less than 0.3% even considering the whole temperature evolution. It was also clear that all the curves eventually reached the constant of 9.870 (almost $\pi^2$). Moreover, all the curves reached the constant value of $\pi^2$ after Fo reached 0.06, indicating that all the curves became linear.

The effects of the laser location were also studied experimentally. In this Example, using a cylindrical lens, the laser spot was reshaped to a narrow line of 0.1 mm width. The sample was placed at the focal plane of a cylindrical lens to achieve the narrowest line of the laser beam. A 532 nm laser coupled to a modulator was utilized as the heating source. The frequency of the laser beam was set to be 0.1 Hz with a square wave shape using the modulator. The setup was placed in a vacuum chamber to run the experiment under 2 mTorr to make the convection effect negligible. To calculate the optimum magnitude of the DC current for use in the laser irradiation method ($I_1$), the current magnitude applied in the step current method ($I_0$) was used for analysis. The step current $I_0$ was chosen such that the smallest sensible transient voltage drop was observed in the sample before reaching the steady state voltage $V_0$. Assuming a resistance R for the sample, the amount of induced Joule's heating and the $V_0$ were $RI_0^2$ and $RI_0$ respectively. Also, assuming the temperature change in the sample was $\Delta T_0$ due to the applied current, the ratio of the voltage drop over the steady state voltage was calculated as $A=\Delta V/RI_0$.

In addition to the DC current, a laser beam irradiated the sample and induced a transient temperature change in the sample. Passing a DC current of $I_1$ through the sample, the corresponding induced temperature change ($\Delta T_1$) was calculated as $\Delta T_1=(I_1/I_0)^2\Delta T_0$. Upon laser irradiation, an additional temperature change occurred in the sample ($\Delta T'$). As a result, the ratio of the voltage drop (due to the laser irradiation) in terms of the voltage drop ratio could be written as $B_{laser}=\Delta T'/\Delta T_0 A$. Further, it was desirable that the voltage drop caused by the applied current and laser irradiation be the smallest sensible one (i.e., $\Delta V_0$). As a result, it could be concluded that $RI_1 B_{laser}=\Delta V_0$. Reorganizing the above expressions, the following was obtained: $\Delta T'=\Delta T_0 I_0/I_1$. Ultimately, the total temperature change could be expressed according to Equation 17:

$$\Delta T_{TOTAL} = \left[\left(\frac{I_1}{I_0}\right)^2 + \frac{I_0}{I_1}\right]\Delta T_0$$

To have the lowest temperature rise in the sample based on Equation 17, the relation between the DC current magnitudes was $I_1=0.79 I_0$.

Figure 6A:
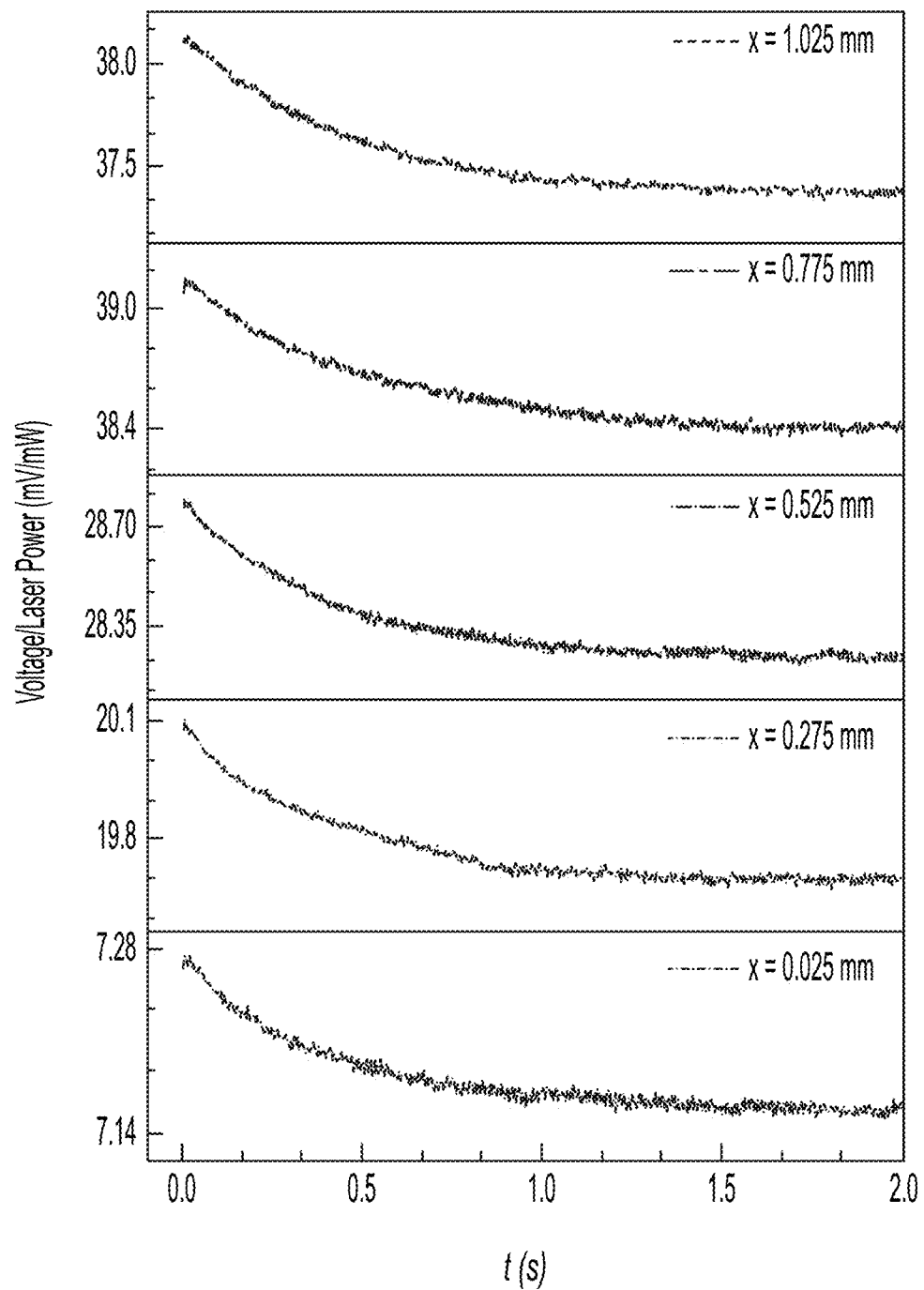
FIG. 6A shows plots illustrating the ratio of voltage drop to laser power as a function of time (sec) at different locations, in accordance with some embodiments of the technology described herein.
Figure 6B:
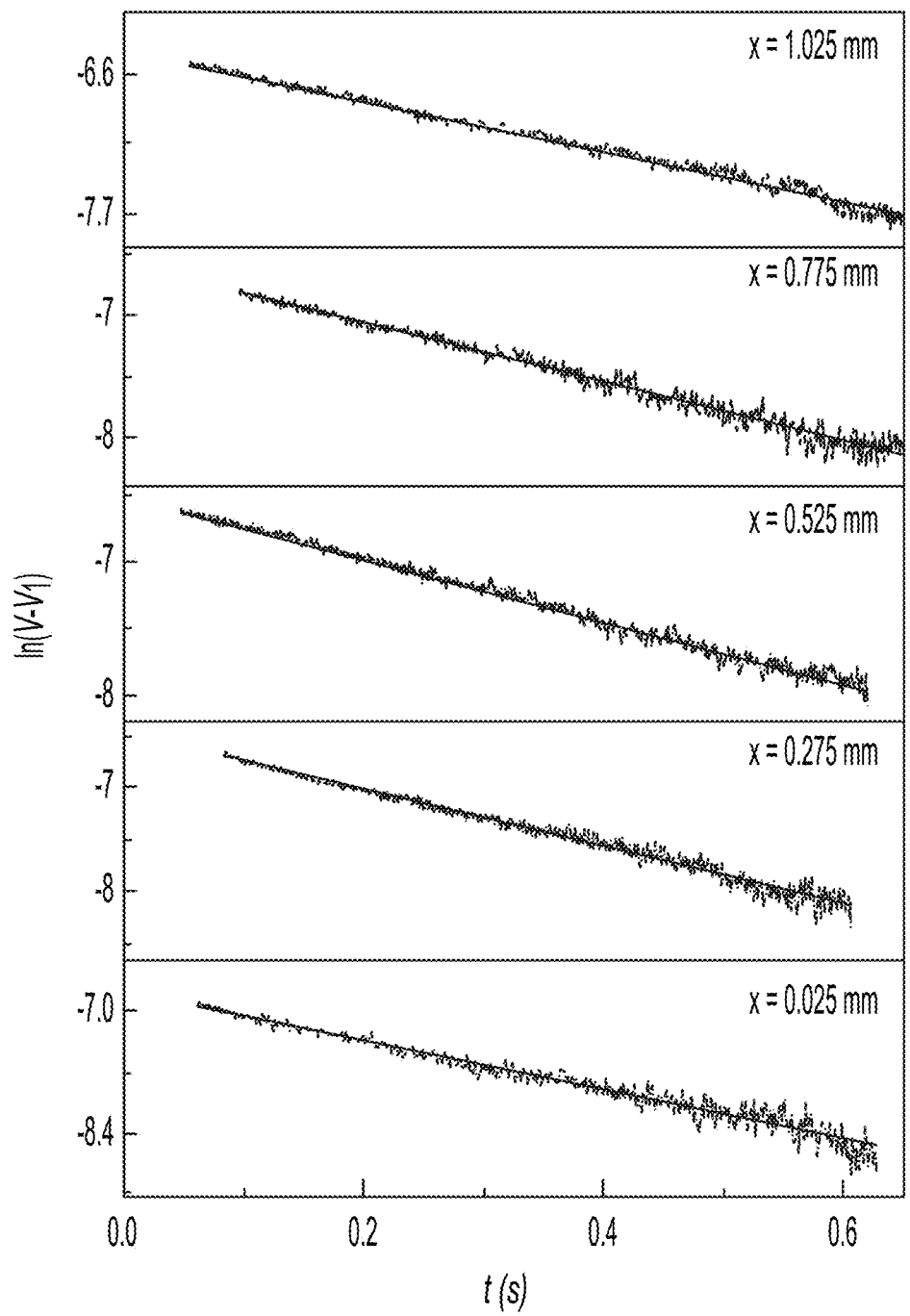
FIG. 6B shows plots illustrating the quantity $\ln(V-V_1)$ as a function of time (sec) at different locations, in accordance with some embodiments of the technology described herein.

A DC current of 20 µA was used during the experiment. To have approximately the same voltage drop for different locations, the amount of laser power was adjusted during the experiment. The closer the laser beam to the ends of the sample, the more power was needed to have a clear signal of the transient voltage change. Moreover, the laser power value was controlled not to have a high temperature rise through the sample, so the sample's structure would not change. FIG. 6A shows the ratio of the voltage drop under uniform laser power irradiation at different locations. It can be seen that as the laser spot location moved from the ends of the sample toward the middle, the ratio of voltage drop over laser power increased. For instance, for the laser location of x=0.025 mm, the range of this ratio was from 7.25-7.20 mV/mW, while the range for the location of x=1.025 mm was from 38.06 to 37.5 mV/mW. Having almost the same voltage drop value for different locations, this noticeable difference simply means that more laser power was needed for the locations near the ends of the sample. In other words, with the same amount of laser power, the signal or the voltage drop for the locations closer to the ends of the sample was weaker compared to the middle ones. This is because when the laser spot is close to the sample's ends, the sample's total thermal resistance is smaller. Therefore, a lower temperature rise was induced under the same laser heating. Ultimately, a power range of nearly 2-10 mW was used during the laser scanning over the sample. FIG. 6B depicts the results of $\ln(V-V_1)$ for different locations over time.

It is clear that all the curves for different locations resemble a line, and their slope was ultimately used to determine the thermal diffusivity of the sample for different laser spot locations. It should be noted that the data between $T^*=0.1$ and $T^*=0.8$ were used for fitting purposes. All the fittings show excellent agreement with the measured data.

Figure 7:
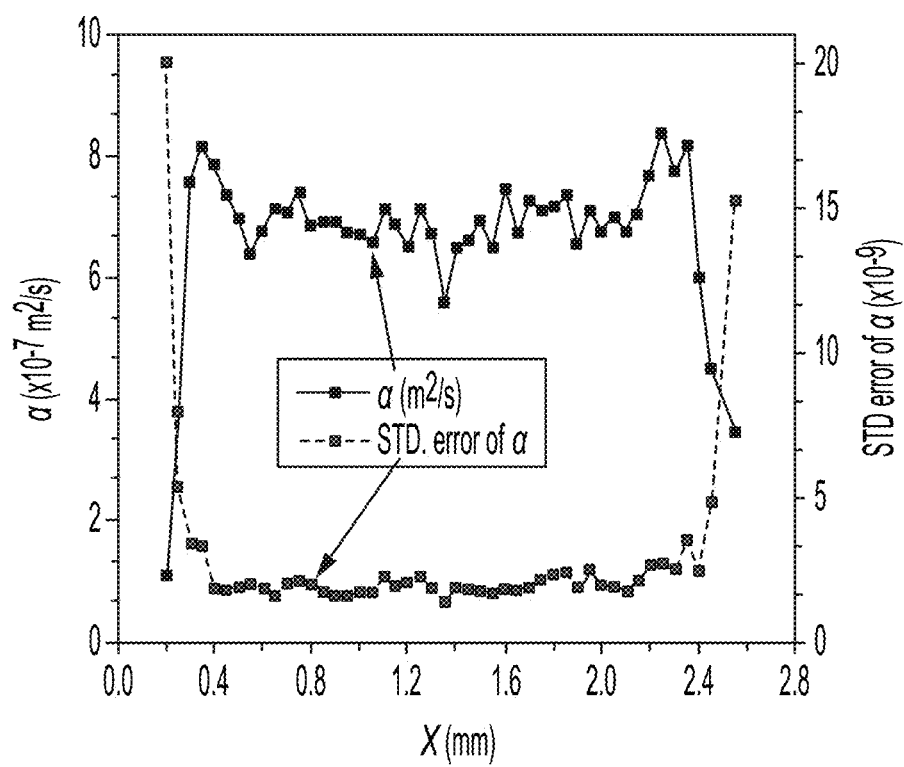
FIG. 7 is a plot illustrating the thermal diffusivity of a sample and associated uncertainty for different laser heating locations, in accordance with some embodiments of the technology described herein.

The results of the determined thermal diffusivity of the graphene sample with respect to the laser heating location are shown in FIG. 7. Based on this figure, except the locations near the sample two ends, it is evident that the α value (thermal diffusivity) remained almost constant with respect to the laser beam incident location. Accordingly, for thermal characterization of a micro/nanoscale wire with the techniques described herein, the laser beam incidence location on the sample has little effect on thermal diffusivity values. For the locations close to the sample's ends, due to the low thermal resistance between the laser irradiated location and the electrodes, more laser power was needed to provide a meaningful voltage signal. Therefore, this higher laser power could have changed the boundary conditions (room temperature) that had been assumed for the heat transfer model for the techniques described herein. Ultimately, the average value of α for different laser locations was about $9.17\times10^{-7}$ m$^2$s$^{-1}$, which became about $7.02\times10^{-7}$ m$^2$s$^{-1}$ after the radiation effect was subtracted. After excluding the locations near the ends of the sample, the average value of α became about $9.08\times10^{-7}$ m$^2$s$^{-1}$, and about $6.93\times 10^{-7}$ m$^2$s$^{-1}$ after subtraction of the radiation effect.

It was found that the difference between the thermal diffusivity value obtained via laser heating (in this Example) differed from the value obtained via step current (in Example 1) by about 7.1%. This may have been caused by at least one of two factors. First, for most materials, as temperature increases, the overall thermal reffusivity (i.e., the inverse of thermal diffusivity) increases and the overall thermal diffusivity decreases. The overall temperature rise of the sample under laser heating is generally higher than under current irradiation as both current and laser irradiation are applied to the sample. The temperature change of the sample during current irradiation is due to the step DC current and can be calculated from $\Delta T_0 = RI_0^2 L/12kA_s$, where $A_s$ is the cross-sectional area of the sample. The thermal conductivity of the graphene fiber can be calculated as $k=\alpha\rho c_p$, and the $\rho c_p$ of graphite can be used for the graphene fiber. For the method of this Example, the temperature change occurred because of the DC current and the step laser irradiation. The corresponding values can be calculated from $\Delta T_1=(I_1/I_0)^2 \Delta T_0$ and $\Delta T'=\Delta T_0[(\Delta V_1/V_1)/(\Delta V_0/V_0)]$, where $\Delta V_0$ and $\Delta V_1$ are the voltage drops due to the step DC current and step laser irradiation respectively. The temperature rise during Example 1 was about 2.2 K and the temperature rise during this Example was about 7 K.

Second, the methods used for data fitting in this Example were slightly different in $V_1$ selection compared to Example 1. In FIG. 7, the values of standard error (uncertainty) values for calculated α at different laser locations are presented. The uncertainty variation of α was compatible with the α variation vs. laser location as it was higher in the vicinity of the sample ends, and it was generally around $2.5\times10^{-9}$ m$^2$/s. Significantly, the typical level of uncertainty for the linear fitting in this study was smaller than the fitting value by more than 2 orders of magnitude, and relative uncertainty was about 0.28%.

Overall, it was found that $\ln(1-T^*)$~t quickly became linear and the ultimate value for the coefficient A was the same constant $\pi^2$ regardless of the laser heating location. The scale of initial nonlinearity between $\ln(1-T^*)$ and time depended on the laser location on the sample, and the level of nonlinearity was higher when the laser spot was at the sample's two ends. Discarding the data before $T^*=0.1$, for the laser location of x=0.025 mm for a 2 mm long sample, the deviation (initial nonlinearity) of the corresponding coefficient A from $\pi^2$ was nearly 1.38%. In comparison, it was 1.88% considering all the data for fitting. For the laser locations of 25% (x=0.5 mm) to 75% (x=1.5 mm) on the sample, however, the deviation was weaker (less than 0.3%). The experimental results confirmed this finding.

Having thus described several aspects of at least one embodiment of this technology, it is to be appreciated that various alterations, modifications, and improvements will readily occur to those skilled in the art. Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The terms "program" or "software" are used herein in a generic sense to refer to any type of computer code or set of processor-executable instructions that can be employed to program a computer or other processor to implement various aspects of embodiments as described herein. Additionally, in some embodiments, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples have been provided including with reference to FIGS. 3A-3B. The steps performed as part of each method may be ordered in any suitable way. Accordingly, embodiments may be constructed in which steps are performed in an order different than illustrated, which may include performing some steps simultaneously, even though shown as sequential steps in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Unless otherwise specified, the terms "approximately," "substantially" and "about" may be used to mean within ±10% of a target value in some embodiments. The terms "approximately," "substantially" and "about" may include the target value.

What is claimed is:

1. A method for determining a thermal characteristic of a sample, comprising:
    coupling a first portion of the sample to a first electrode and a second portion of the sample to a second electrode;
    causing a temperature variation in the sample;
    determining content associated with a first variable representing a transient signal arising between the first and second electrodes in response to the temperature variation;
    determining content associated with a second variable using a logarithmic function and the content of the first variable; and
    determining the thermal characteristic of the sample by applying a linear regression to the content of the second variable.

2. The method of claim 1, wherein causing the temperature variation in the sample comprises controlling a laser source to irradiate the sample.

3. The method of claim 1, wherein the temperature variation is in a range from 1 K to 10 K.

4. The method of claim 1, wherein determining content associated with the first variable comprises sensing a voltage arising between the first electrode and the second electrode over time.

5. The method of claim 1, wherein determining the content associated with the second variable comprises:
    determining content associated with a third variable representing a steady-state signal arising between first and second electrodes in response to the temperature variation;
    determining content associated with a fourth variable by subtracting the content associated with the third variable from the content associated with the first variable; and
    applying the logarithmic function to the content associated with the fourth variable.

6. The method of claim 1, wherein the logarithmic function comprises a natural logarithmic function.

7. The method of claim 1, wherein determining the thermal characteristic of the sample comprises determining a thermal diffusivity, a thermal conductivity, and/or a specific heat of the sample.

8. The method of claim 1, wherein the thermal characteristic of the sample is temperature-dependent, wherein the method further comprises determining a temperature of the sample, and wherein determining the thermal characteristic of the sample comprises determining the thermal characteristic of the sample based on the temperature of the sample.

9. The method of claim 1, further comprising, subsequent to coupling the first portion of the sample to the first electrode and the second portion of the sample to the second electrode:
applying a conductive paste to the first and second electrodes.

10. The method of claim 1, wherein the first and second electrodes are disposed in a housing, wherein the method further comprises, prior to causing the temperature variation in the sample:
reducing a pressure within the housing using a vacuum pump.

11. The method of claim 1, wherein causing the temperature variation in the sample comprises controlling a current generator, coupled to the first and second electrodes, to generate an electric current.

12. The method of claim 11, wherein the electric current comprises a stepped profile.

13. The method of claim 12, wherein the stepped profile comprises a transition having a rise time of 1 msec or less.

14. The method of claim 1, further comprising determining a value representing an uncertainty associated with the thermal characteristic using the linear regression.

15. The method of claim 14, wherein the uncertainty is at least two orders of magnitude less than the thermal characteristic of the sample.

16. The method of claim 14, wherein the uncertainty is about $5 \times 10^{-9}$ m$^2$/s or less.

17. A system for determining a thermal characteristic of a sample, comprising:
a housing;
first and second electrodes disposed in the housing; and respectively coupled to a first portion of the sample and a second portion of the sample and
a processor configured to:
cause a temperature variation in the sample;
determine content associated with a first variable representing a transient signal arising between the first and second electrodes in response to the temperature variation;
determine content associated with a second variable using a logarithmic function and the content of the first variable; and
determine the thermal characteristic of the sample by applying a linear regression to the content of the second variable.

18. The system of claim 17, further comprising a laser source, wherein the processor is configured to cause the temperature variation in the sample by controlling the laser source to irradiate the sample.

19. The system of claim 17, wherein the temperature variation is in a range from 1 K to 10 K.

20. The system of claim 17, further comprising a voltage sensor disposed in the housing.

21. The system of claim 17, wherein the processor is configured to determine the content associated with the second variable by:
determining content associated with a third variable representing a steady-state signal arising between first and second electrodes in response to the temperature variation;
determining content associated with a fourth variable by subtracting the content associated with the third variable from the content associated with the first variable; and
applying the logarithmic function to the content associated with the fourth variable.

22. The system of claim 17, wherein the logarithmic function comprises a natural logarithmic function.

23. The system of claim 17, wherein determining the thermal characteristic of the sample comprises determining a thermal diffusivity, a thermal conductivity, and/or a specific heat of the sample.

24. The system of claim 17, wherein the processor is further configured to determine a value representing an uncertainty associated with the thermal characteristic using the linear regression.

25. The system of claim 17, further comprising a temperature sensor disposed in the housing and configured to determine a temperature of the sample, wherein the thermal characteristic of the sample is temperature-dependent, and wherein determining the thermal characteristic of the sample comprises determining the thermal characteristic of the sample based on the temperature determined by the temperature sensor.

26. The system of claim 17, further comprising a heater disposed in the housing,
wherein the processor is further configured to set a temperature of the sample by controlling the heater to produce heat.

27. The system of claim 17, further comprising a conductive paste applied to the first and second electrodes.

28. The system of claim 17, further comprising a vacuum pump coupled to the housing.

29. The system of claim 17, further comprising a current generator coupled to the first and second electrodes, wherein the processor is configured to cause the temperature variation in the sample by controlling the current generator to generate an electric current.

30. The system of claim 29, wherein the electric current comprises a stepped profile.

31. The system of claim 30, wherein the stepped profile comprises a transition having a rise time of less than 1 msec.

* * * * *